(12) United States Patent
De Gracia et al.

(10) Patent No.: US 8,106,127 B2
(45) Date of Patent: *Jan. 31, 2012

(54) HETEROGENEOUS IN-REACTOR POLYMER BLENDS

(75) Inventors: Carlos U. De Gracia, La Porte, TX (US); Kevin R. Squire, Kingwood, TX (US); Peijun Jiang, League City, TX (US); Armenag H. Dekmezian, Austin, TX (US); Beverly J. Poole, Houston, TX (US); Cesar A. Garcia-Franco, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/638,861

(22) Filed: Dec. 15, 2009

(65) Prior Publication Data

US 2010/0152390 A1 Jun. 17, 2010

Related U.S. Application Data

(63) Continuation-in-part of application No. 12/335,252, filed on Dec. 15, 2008, now Pat. No. 8,022,142.

(51) Int. Cl.
*C08F 8/00* (2006.01)
*C08L 23/04* (2006.01)
*C08L 23/10* (2006.01)
*C08K 5/00* (2006.01)

(52) U.S. Cl. ............ 525/191; 525/240; 524/515

(58) Field of Classification Search ............ 525/191, 525/240; 524/515
See application file for complete search history.

(56) References Cited

U.S. PATENT DOCUMENTS

| | | | |
|---|---|---|---|
| 4,999,403 A | 3/1991 | Datta et al. | |
| 5,166,268 A | 11/1992 | Ficker | |
| 5,514,761 A | 5/1996 | Etherton et al. | |
| 5,962,595 A | 10/1999 | Dolle et al. | |
| 6,114,457 A | 9/2000 | Markel et al. | |
| 6,117,962 A | 9/2000 | Weng et al. | |
| 6,147,180 A | 11/2000 | Markel et al. | |
| 6,184,327 B1 | 2/2001 | Weng et al. | |
| 6,197,910 B1 | 3/2001 | Weng et al. | |
| 6,248,832 B1 | 6/2001 | Peacock | |
| 6,248,833 B1 | 6/2001 | Colucci et al. | |
| 6,287,705 B1 | 9/2001 | Seta et al. | |
| 6,319,998 B1 | 11/2001 | Cozewith et al. | |
| 6,323,284 B1 | 11/2001 | Peacock | |
| 6,342,574 B1 | 1/2002 | Weng et al. | |
| 6,423,793 B1 | 7/2002 | Weng et al. | |
| 6,441,111 B1 | 8/2002 | Ushioda et al. | |
| 6,512,019 B1 | 1/2003 | Agarwal et al. | |
| 6,555,635 B2 | 4/2003 | Markel | |
| 6,635,715 B1 | 10/2003 | Datta et al. | |
| 6,660,809 B1 | 12/2003 | Weng et al. | |
| 6,806,316 B2 | 10/2004 | Mehta et al. | |
| 7,101,936 B2 | 9/2006 | Weng et al. | |
| 7,223,822 B2 | 5/2007 | Abhari et al. | |
| 7,256,240 B1 | 8/2007 | Jiang | |
| 7,294,681 B2 | 11/2007 | Jiang et al. | |
| 7,365,136 B2 | 4/2008 | Huovinen et al. | |
| 2004/0054100 A1 | 3/2004 | Debras et al. | |
| 2004/0127614 A1 | 7/2004 | Jiang et al. | |
| 2004/0220320 A1 | 11/2004 | Abhari et al. | |
| 2004/0220336 A1 | 11/2004 | Abhari et al. | |
| 2004/0249046 A1 | 12/2004 | Abhari et al. | |
| 2004/0249084 A1 | 12/2004 | Stevens et al. | |
| 2006/0173132 A1 | 8/2006 | Mehta et al. | |
| 2006/0199873 A1 | 9/2006 | Mehta et al. | |
| 2006/0211819 A1 | 9/2006 | Hoenig et al. | |
| 2006/0281868 A1 | 12/2006 | Sudhin et al. | |
| 2006/0293453 A1 | 12/2006 | Jiang et al. | |
| 2006/0293455 A1 | 12/2006 | Jiang et al. | |
| 2006/0293460 A1 | 12/2006 | Jacob et al. | |

(Continued)

FOREIGN PATENT DOCUMENTS

| | | |
|---|---|---|
| EP | 0 206 515 | 12/1986 |
| EP | 0 366 411 | 5/1990 |
| EP | 0 749 992 | 12/1996 |
| WO | WO 03/040201 | 5/2003 |
| WO | WO 2004/060994 | 7/2004 |

OTHER PUBLICATIONS

Dankova et al., *Models for Conformationally Dynamic Metallocenes. Copolymerization Behavior of the Unbridged Metallocene (1-Methyl-2-phenylindenyl)(2-phenylindenyl)zirconium Dichloride*, Macromolecules, 2002, vol. 35, No. 8, pp. 2882-2891.

Arriola et al., *Catalytic Production of Olefin Block Copolymers via Chain Shuttling Polymerization*, Science, 2006, vol. 312, pp. 714-719.

Lohse et al., *Graft Copolymer Compatibilizers for Blends of Polypropylene and Ethylene-Propylene Copolymers*, Macromolecules, 1991, vol. 24, No. 2, pp. 561-566.

*Primary Examiner* — Nathan M Nutter
(74) *Attorney, Agent, or Firm* — Darryl M. Tyus

(57) ABSTRACT

An in-reactor polymer blend comprises (a) a propylene-containing first polymer; and (b) an ethylene-containing second polymer such that the polymer blend comprises between about 50 wt % and about 80 wt % units derived from ethylene and between about 50 wt % and about 20 wt % units derived from propylene. The blend is substantially free of dienes and the content of ethylene in the second polymer in the form of ethylene-ethylene-ethylene triads is at least 40%. The second polymer contains at least 0.1 branch having 8 or more carbon atoms per 10,000 carbons. In addition, the blend has a strain hardening index of at least 1.8, a shear thinning slope in the plot of log(dynamic viscosity) versus log(frequency) of less than −0.2 and exhibits at least two peaks when subjected to Differential Scanning Calorimetry (first melt) corresponding to a first melting point of at least 150° C. and a second melting point of at least 40° C. such that the difference between the first and second melting temperatures is at least 20° C.

20 Claims, 4 Drawing Sheets

U.S. PATENT DOCUMENTS

| | | |
|---|---|---|
| 2006/0293461 A1 | 12/2006 | Jacob et al. |
| 2006/0293462 A1 | 12/2006 | Jacob et al. |
| 2007/0129497 A1 | 6/2007 | Jiang et al. |
| 2007/0282073 A1 | 12/2007 | Weng et al. |
| 2007/0284787 A1 | 12/2007 | Weng et al. |
| 2008/0027173 A1 | 1/2008 | Ravishankar |
| 2008/0033124 A1 | 2/2008 | Jiang et al. |
| 2010/0152382 A1* | 6/2010 | Jiang et al. ............ 525/53 |
| 2010/0152388 A1* | 6/2010 | Jiang et al. ............ 525/211 |

* cited by examiner

CH$_2$Branches

TREF comparison of the fractions and original sample is shown in the graphic:

HETEROGENEOUS IN-REACTOR POLYMER BLENDS

PRIORITY CLAIM

This patent application is a continuation-in-part of U.S. patent application Ser. No. 12/335,252, filed Dec. 15, 2008, now issued as U.S. Pat. No. 8,022,142, incorporated herein in its entirety.

FIELD OF THE INVENTION

This invention relates to heterogeneous in-reactor polymer blends, their production and their use in forming molded components.

BACKGROUND OF THE INVENTION

Thermoplastic olefins (TPOs), impact copolymers (ICPs) and thermoplastic vulcanizates (TPVs), collectively referred to herein as "heterogeneous polymer blends", typically comprise a crystalline thermoplastic phase and a high molecular weight or crosslinked elastomeric phase. These heterogeneous polymer blends also commonly include non-polymeric components, such as fillers and other compounding ingredients. The heterogeneous polymer blends have multiphase morphology where a thermoplastic, such as isotactic polypropylene (often referred as the hard phase), forms a continuous matrix phase and the elastomeric component (often referred as the soft phase), generally derived from an ethylene containing copolymer, is the dispersed component. The polypropylene matrix imparts tensile strength and chemical resistance to the blend, while the ethylene copolymer imparts flexibility and impact resistance.

TPOs and ICPs are typically made during the polymerization process by differential polymerization of the polymer components, although some can also be made by mechanical blending. TPVs are also blends of thermoplastic and elastomer, like TPOs, except that the dispersed elastomeric component is crosslinked or vulcanized in a reactive extruder during compounding. Crosslinking of the elastomeric phase generally allows dispersion of higher amounts of rubber in the polymer matrix, stabilizes the obtained morphology by preventing coalescence of rubber particles, and enhances mechanical properties of the blend.

Traditionally, the elastomeric component in heterogeneous polymer blends has been provided by highly amorphous, very low density ethylene-propylene copolymers (EP) and ethylene-propylene-diene terpolymers (EPDM) having a high molecular weight expressed in Mooney units. Recently, other ethylene-alpha olefin copolymers have been used, especially very low density ethylene-butene, ethylene-hexene and ethylene-octene copolymers which generally have a lower molecular weight expressed in Melt Index units. The density of these latter polymers is generally less than 0.900 g/cm$^3$, indicative of some residual crystallinity in the polymer.

The major market for TPOs is in the manufacture of automotive parts, especially bumper fascia. Other applications include automotive interior components such as door skins, air bag covers, side pillars and the like. These parts are generally made using an injection molding processes. To increase efficiency and reduce costs, it is necessary to decrease molding times and reduce wall thickness in the molds. To accomplish these goals, manufacturers have turned to high melt flow polypropylenes (Melt Flow Rate>35 dg/min.). These high melt flow rate (MFR) resins are low in molecular weight and consequently difficult to toughen, resulting in products that have low impact strength. It would be desirable to have a polymer blend with greater elongation to break and more toughness, improved processability, and/or a combination thereof.

In addition, in-reactor blends have been sought as an alternative to physical blending since in-reactor blends offer the possibility of improved mechanical properties through more intimate mixing between the hard and soft phases, through the generation of hard/soft cross products, as well as lower production costs. Use of compatibilizer is another way to improve interfacial tension between hard and soft phases in the heterogeneous blend, thereby improving the mechanical properties.

For example, Datta, et al [D. J. Lohse, S. Datta, and E. N. Kresge, Macromolecules 24, 561 (1991)] describe EP backbones functionalized with cyclic diolefins by terpolymerization of ethylene, propylene and diolefin. The statistically functionalized EP "soft block" is then copolymerized with propylene in the presence of a Ziegler-Natta catalyst capable of producing isotactic polypropylene. In this way, some of the "hard" block polypropylene chains are grafted through the residual olefinic unsaturation onto the EP "soft" block previously formed. See also, EP-A-0 366411. U.S. Pat. No. 4,999,403 describes similar graft copolymer compounds where functional groups in the EPR backbone are used for grafting isotactic polypropylene having reactive groups. In both the graft copolymers are said to be useful as compatibilizer compounds for blends of isotactic polypropylene and ethylene-propylene rubber. A limitation of this class of reactions, in which chains with multiple functionalities are used in subsequent reactions, is the formation of undesirable high molecular weight material typically referred to as gel in the art.

U.S. Pat. No. 6,147,180 discloses a thermoplastic elastomer composition comprising a branched olefin copolymer backbone and crystallizable side chains, wherein the copolymer has A) a $T_g$ as measured by DSC less than or equal to 10° C.; B) a $T_m$ greater than 80° C.; C) an elongation at break of greater than or equal to 300%; D) a tensile strength of greater than or equal to 1,500 psi (10.3 MPa) at 25° C. and E) an elastic recovery of greater than or equal to 50%. The thermoplastic elastomer composition can be produced by A) polymerizing ethylene or propylene, optionally with one or more copolymerizable monomers, in a polymerization reaction under conditions sufficient to form a polymer having greater than 40% chain end-group unsaturation; and B) copolymerizing the product of A) with ethylene and one or more copolymerizable monomers so as to prepare said branched olefin copolymer. The two polymerization steps can be conducted sequentially or concurrently.

U.S. Pat. No. 6,114,457 describes a high melt strength polyethylene composition having a polydispersity index of less than or equal to 3, an average branching index (g') as measured by GPC/V is of at least 0.9, wherein the composition comprises A) branched polyethylene copolymers prepared by insertion polymerization of ethylene, ethylene-containing macromers, and optionally, additional copolymerizable monomers, and B) essentially linear ethylene copolymers.

U.S. Pat. No. 6,423,793 describes a thermoplastic elastomer composition comprising: (a) isotactic or syndiotactic polymer branches derived from macromers that are prepared by a process comprising contacting, in solution, at a temperature from about 90° C. to about 120° C., propylene monomers with a catalyst composition comprising a chiral, stereorigid transition metal catalyst compound capable of producing isotactic or syndiotactic polypropylene; and (b) an atactic polymer backbone prepared by a process comprising copolymerizing the macromers with propylene and, optionally, one or more copolymerizable monomers, such as ethylene, in a polymerization reactor using an achiral transition metal catalyst capable of producing atactic polypropylene.

U.S. Pat. No. 6,660,809 describes a polyolefin product which comprises a branched olefin copolymer having an isotactic polypropylene backbone, polyethylene branches and, optionally, one or more comonomers. The total comonomer content of the branched olefin copolymer is from 0 to 20 mole percent. Also, the mass ratio of the isotactic polypropylene to the polyethylene ranges from 99.9:0.1 to 50:50. The copolymer is produced by a process which comprises: a) copolymerizing ethylene, optionally with one or more copolymerizable monomers, in a polymerization reaction under conditions sufficient to form copolymer having greater than 40% chain end-group unsaturation; b) copolymerizing the product of a) with propylene and, optionally, one or more copolymerizable monomers, in a polymerization reactor under suitable polypropylene polymerization conditions using a chiral, stereorigid transition metal catalyst capable of producing isotactic polypropylene; and c) recovering a branched olefin copolymer.

More recently, a process has been proposed for producing olefin block copolymers by a so called chain shuttling polymerization, in which growing polymer chains are thought to be passed between catalyst sites with the assistance of a metal alkyl complex, so that portions (or blocks) of a single polymer molecule are synthesized by at least two different catalysts. See, Arriola et al. "Catalytic Production of Olefin Block Copolymers via Chain Shuttling Polymerization", Science, May 5, 2006, Vol. 312. The resultant block copolymers are thought to be linear and are reported to have good elastomeric properties at temperatures higher than those of traditional random copolymers of similar density, suggesting that these block copolymers should be useful in high-temperature applications. However, although the process has been demonstrated for copolymers comprising propylene/ethylene "hard" blocks and ethylene/octene "soft" blocks, it is not currently clear that the process is applicable to copolymers comprising isotactic polypropylene "hard" blocks.

U.S. Pat. No. 7,223,822 describes a process for producing branched polymers including at least 50 mol % $C_3$ to $C_{40}$ olefins, wherein the process includes: (1) feeding a first catalyst, an activator, and one or more $C_2$ to $C_{40}$ olefins into a first reaction zone at a temperature of greater than 70° C. and a residence time of 120 minutes or less to produce a product; (2) feeding the product, a second catalyst, and an activator into a second reaction zone at a temperature of greater than 70° C., and a residence time of 120 minutes or less. One of the catalysts should be chosen to produce a polymer having a weight average molecular weight of 100,000 or less and a crystallinity of 20% or less. The other catalyst should be chosen to produce a polymer having a weight average molecular weight of 100,000 or less and a crystallinity of 20% or more.

US Patent Application Publication No. 2006/0293455 discloses an in-reactor heterogeneous polymer blend comprising (a) a continuous phase comprising a thermoplastic first polymer having a crystallinity of at least 30%; and (b) a dispersed phase comprising particles of a second polymer different from the first polymer dispersed in said continuous phase and having an average particle size less than 1 micron. The second polymer has a crystallinity of less than 20% and is at least partially crosslinked, making the blend useful as a thermoplastic vulcanizate. The blend is said to contain branched block copolymers comprising an amorphous backbone having crystalline side chains originating from the first polymer.

In our co-pending U.S. patent application Ser. No. 12/335,252, filed Dec. 15, 2008) we have disclosed an in-reactor polymer blend comprising (a) a propylene-containing first polymer; and (b) propylene-containing second polymer having a different crystallinity from the first polymer, wherein the polymer blend has a melting temperature, Tm, of at least 135° C., a melt flow rate of at least 70 dg/min, a tensile strength of at least 8 MPa, an elongation at break of at least 300%. Thus this blend exhibits a unique combination of a high melt flow rate combined with high tensile strength, tear strength and elongation at break, making it attractive for injection molding applications and particularly for injection molding components having a scratch resistant skin.

Certain applications of TPOs, such as in automotive fascia panels, require a unique, and difficult to achieve, set of properties including injection moldability, high strength, good scratch resistance and good grain retention. As a result, most TPOs used for these applications are styrenic block copolymers (SBC), typically linear triblock polymers, such as styrene-isoprene-styrene and styrene-butadiene-styrene, such as Kraton G 1650. These copolymers typically are prepared by sequential anionic polymerization or by chemical coupling of linear diblock copolymers. However, SBC copolymers are relatively expensive compared to TPOs based on ethylene and propylene. Also the glass transition temperature ($T_g$) of the styrenic block copolymer is typically less than or equal to about 80-90° C., thus presenting a limitation on the utility of SBC copolymers under higher temperature conditions.

The present invention seeks to provide an in-reactor polymer blend which is based on ethylene and propylene and which exhibits improved injection moldability, strength, scratch resistance and grain retention properties making the blend an attractive alternative to SBCs in automotive fascia applications. This in-reactor polymer blend has crystallinity from both long sequences of methylenes (polyethylene type crystallinity) and long sequences of isotactic propylenes (polypropylene type crystallinity). Consequently, it has a much higher upper use temperature than SBC copolymers. Surprisingly, it has very similar strain at break and stress at break when compared to SBC copolymers.

SUMMARY OF THE INVENTION

In one aspect, the invention resides in an in-reactor polymer blend comprising (a) a propylene-containing first polymer; and (b) an ethylene-containing second polymer such that the polymer blend comprises between about 50 wt % and about 80 wt % units derived from ethylene and between about 50 wt % and about 20 wt % units derived from propylene and is substantially free of dienes, with the content of ethylene in the second polymer in the form of ethylene-ethylene-ethylene triads being at least 40% and with the second polymer containing at least 0.1 branches having 8 or more carbon atoms per 10,000 carbons of the in-reactor blend, wherein the blend has the following properties:

(a) at least two peaks when subjected to Differential Scanning Calorimetry corresponding to a first melting point of at least 150° C. and a second melting point of at least 40° C. such that the difference between the first and second melting temperatures is at least 20° C.;

(b) a strain hardening index of at least 1.8; and (c) a shear thinning slope of the plot of log(dynamic viscosity) versus log(frequency) less than −0.2.

Conveniently, the blend has a weight averaged molecular weight of at least 150,000 g/mol.

Conveniently, the blend has a heat of fusion, ΔHf, of 80 J/g or less, such as 20 to 70 J/g, preferably 70 J/g or less, such as 30 to 70 J/g.

Conveniently, at least 90 wt %, such as at least 95 wt %, and normally 100 wt %, of the blend is soluble in refluxing xylene.

Conveniently, the blend has a stress at break of at least 14 MPa.

Conveniently, the blend has a strain at break of at least 4.

Conveniently, the blend has a viscosity fraction of chains with relaxation times of 100 seconds of at least 0.7.

In a further aspect, the invention resides in a process for producing the in-reactor polymer blend described herein, the process comprising:

(i) contacting at least one first monomer composition comprising propylene with a first catalyst capable of producing polymer having a crystallinity of 20% or more at the selected polymerization conditions in a first polymerization stage under conditions including a first temperature sufficient to produce the propylene-containing first polymer comprising at least 40% vinyl chain ends; and (ii) contacting at least part of said first polymer with a second monomer composition comprising ethylene and propylene and with a second catalyst capable of producing polymer having a crystallinity of 5% or more in a second polymerization stage under conditions including a second temperature sufficient to polymerize said second monomer composition to produce the ethylene-containing second polymer, wherein the second temperature is less than the first temperature by at least 10° C.

Conveniently, said first temperature is between about 80° C. and about 140° C.

Conveniently, the contacting (i) is conducted by slurry polymerization, whereas typically the contacting (ii) is conducted by solution polymerization. Each of the contacting (i) and contacting (ii) is generally conducted in the presence of a single site catalyst comprising at least one metallocene catalyst and at least one activator.

Conveniently, the molar ratio of propylene to ethylene in the contacting (ii) is 1:1 or less.

DETAILED DESCRIPTION OF THE EMBODIMENTS

Figure 1:
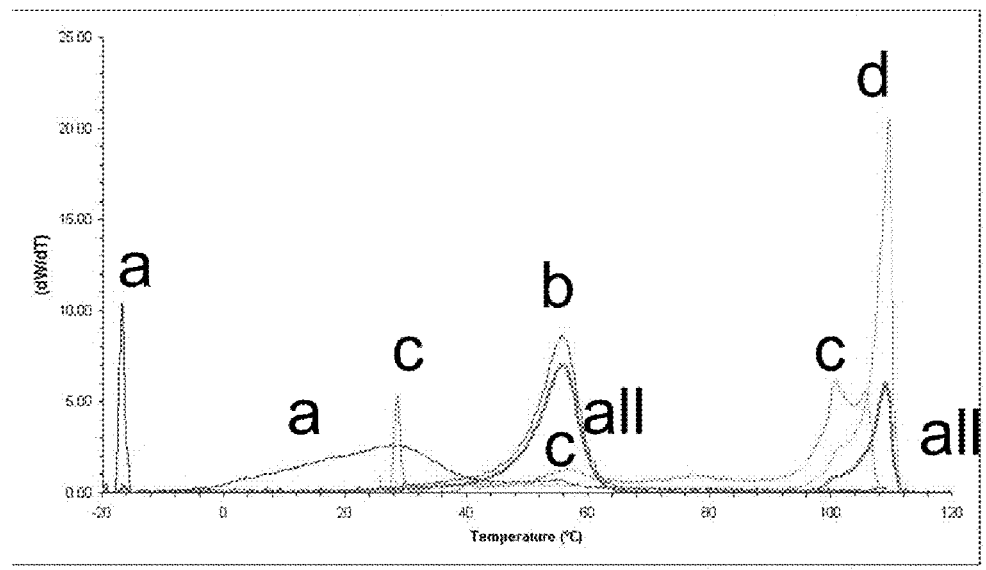
FIG. 1 shows the temperature rising elution fractionation (TREF) trace of dw/dt against elution temperature for the in-reactor polymer blend of Example 1.

As used herein the term "in-reactor polymer blend" is intended to mean a mixture of polymers produced in a plurality of polymerization stages without the need for post polymerization blending (although the resultant copolymer can undergo post polymerization blending, for example, to incorporate modifiers and additives). Each polymer component in the mixture possesses a unique molecular structure such as percent comonomer content, molecular weight and molecular architecture such as branched block copolymers. Although the various polymerization stages will normally be conducted in different polymerization zones, that is in different reactors or different parts of the same reactor, the stages could be conducted sequentially in the same polymerization zone.

A polymerization zone is defined as an area where activated catalysts and monomers are brought in contact and a polymerization reaction takes place. When multiple reactors are used in either series or parallel configuration, each reactor is considered as a separate polymerization zone. For a multi-stage polymerization in both a batch reactor and a continuous reactor, each polymerization stage is considered as a separate polymerization zone.

As used herein the term "branched block copolymer" is defined as the cross product obtained when a first polymer chain (also referred as macromonomer) with reactive polymerizable chain ends is incorporated into a second polymer chain during the polymerization of the latter. The resulting product comprises a backbone defined by one of the polymer chains with branches of the other polymer chains extending from the backbone, wherein the backbone and branches possess different and unique molecular structures, such as chemical composition and crystallinity. Since the molecular structure/composition in the backbone and branches are different, the branched block composition has characteristics from both the backbone and the branches. Branched block copolymers are also referred to as branched cross products. In one embodiment, the branches are comprised of isotactic homopolypropylene and the backbone is comprised of an ethylene/propylene copolymer with at least one monomer selected from ethylene or $C_4$ to $C_{12}$ alpha olefin. Long chain branching (that is having branches having 8 or more carbon atoms) can be observed by $^{13}C$ NMR.

To effectively incorporate a reactive polymer chain into other growing polymer chains, it is preferable that the first polymerization stage produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. Vinyl terminated chains are generally more reactive using coordination catalysts than vinylene or vinylidene terminated chains. Generally, it is desirable that the first polymerization step produces a first polymer having at least 40%, such as at least 60%, vinyl terminal unsaturation based on the total unsaturated olefin chain ends. Unsaturated chain ends can be determined using proton NMR.

The term "shear thinning slope" (STS), as used herein, is measured using plots of the logarithm (base ten) of the dynamic viscosity versus logarithm (base ten) of the frequency. The slope is the difference in the log(dynamic viscosity) at a frequency of 100 s$^{-1}$ and the log (dynamic viscosity) at a frequency of 0.01 s$^{-1}$ divided by 4. These plots are the typical output of small angle oscillatory shear (SAOS) experiments. For ethylene/propylene copolymers, a conventional SAOS test temperature is 190° C. Polymer viscosity is conveniently measured in poise (dyne-second/square centimeter) at shear rates within a range of from 0 radian per second (rad/sec) to 100 rad/sec and at 190° C. under a nitrogen atmosphere using a dynamic mechanical spectrometer, such as the Advanced Rheometrics Expansion System (ARES). Generally a low value for STS indicates a polymer is highly shear-thinning and that it is readily processable in high shear processes, for example by injection molding.

The term "strain hardening index" (SHI), as used herein, is the ratio of the stress at break divided by the yield stress in a stress-strain curve. Stress-strain curves were carried out at room temperature using a mechanical testing machine from the MTS Company. Generally, at least five replicate runs were averaged. The test samples were compression molded to a thickness of 0.055+/−0.002 inches (1.4+/−0.05 mm) and were cut to a width of 0.125 inches (3.18 mm). For these samples the microtensile mold was used to cut the samples. Young's modulus was measured by fitting a tangent straight line to the initial part of the stress-strain curves, starting at a strain of 0.0. Yield stresses were calculated by fitting straight lines to the curves in the range of strains from 0.5 to 1.0 and then extrapolating back to a strain of 0.0. For these samples the stress at break was taken as the maximum stress observed before breaking. The strain at break was the strain where the samples broke.

Polymer Blend

Preferred in-reactor polymer blends described herein comprises (a) a propylene-containing first polymer; and (b) an ethylene-containing second polymer such that the overall polymer blend comprises between about 50 wt % and about 80 wt %, generally between about 60 wt % and about 70 wt %, units derived from ethylene and between about 50 wt % and about 20 wt %, generally between about 40 wt % and about 30 wt %, units derived from propylene. The blend is substantially free of dienes and polymer units derived from dienes. Substantially free if dienes is defined to be an amount where the presence of any diene does not significantly affect polymer properties, typically 0.1 mole % or less, preferably 0.001 mole % or less, preferably 0 mole %.

The first polymer is conveniently a propylene homopolymer, such as isotactic, highly isotactic, or highly syndiotactic polypropylene. As used herein, "isotactic" is defined as having at least 20 mole % isotactic pentads, preferably having at least 40% isotactic pentads of methyl groups derived from propylene according to analysis by $^{13}$C-NMR. As used herein, "highly isotactic" is defined as having at least 60 mole % isotactic pentads according to analysis by $^{13}$C NMR.

Particularly useful propylene homopolymers have a crystallinity of at least 20%, generally at least 30%, even 40% or more as determined by differential scanning calorimetry (DSC) as described in the Examples. Heat of fusion is another measure of crystallinity and useful propylene homopolymers typically may have a heat of fusion greater than 20 J/g, preferably greater than 25 J/g, preferably greater than 30 J/g as determined by DSC analysis. Suitable propylene homopolymers typically have a melting temperature of at least 150° C., generally at least 155° C., alternately at least 160° C.

Useful propylene homopolymers normally have a weight averaged molecular weight of at least 20,000 g/mol, such as at least 30,000 g/mol.

The second polymer is conveniently an ethylene/propylene copolymer in which the number of ethylene triads (three consecutive ethylene monomer units, EEE) as measured by proton NMR is at least 10 mol %, for example at least 25 mol %, such as at least 50 mol % of the second polymer. Conveniently, the ethylene/propylene copolymer comprises between about 60 mol % and about 90 mol %, such as between about 80 mol % and about 90 mol %, ethylene and between about 40 mol % and about 10 mol %, such as between about 20 mol % and about 10 mol %, propylene.

Particularly useful ethylene/propylene copolymers have a crystallinity of more than 5%, generally less than 25% (Preferably from 5 to 20%) as determined by differential scanning calorimetry (DSC).

Useful ethylene/propylene copolymers normally have a weight averaged molecular weight of at least 100,000 g/mol, such as at least 150,000 g/mol.

The present in-reactor polymer blend also contains a distribution of cross products formed principally from the incorporation of the first thermoplastic polymer into the second elastomeric polymer. These hybrid crossproducts, also known as branched block copolymers, form when reactive intermediates from the first polymerization step cross-over into the second polymerization step and participate in the polymerization of the second polymer. The presence of branched block copolymers is believed to influence the events occurring during the polymerization as well as product properties. The extent of influence depends on the population distribution of the branched block copolymer fraction. In general the population of long-chain branching in the present in-reactor polymer blend is such that the second polymer contains at least 0.1 branch, generally between about 0.2 and about 1.0 branches, having 8 or more carbon atoms, per 10,000 carbon atoms of the polymer blend as observed by $^{13}$C NMR.

When the present in-reactor polymer blend is subjected to Differential Scanning Calorimetry as described in the Examples, the heating cycle generates at least two peaks corresponding respectively to a first melting point of at least 150° C. and a second melting point of at least 40° C. such that the difference between the first and second melting temperatures is at least 20° C. (preferably at least 25° C., alternately at least 30° C.). Moreover, when fractionated by temperature rising elution fractionation (TREF), the blend typically produces a) no fraction, or a first fraction having a DSC heat of fusion, ΔHf, of 5 J/g or less, eluting below 10° C., b) a second fraction having a DSC heat of fusion, ΔHf, of 5 to 80 J/g, eluting between 10° C. and 90° C. and c) a third fraction having a melting temperature greater than 140° C. and a DSC heat of fusion, ΔHf, of 5 J/g or more eluting above 90° C.

The present in-reactor blend exhibits a number of important properties. For example, the blend has a shear thinning index (STI), or the ratio of polymer viscosity at 190° C. and a shear rate 0 radian per second (rad/sec) to the polymer viscosity at 190° C. and a shear rate 100 rad/sec, of at least 50, such as at least 75, for example at least 100.

This blend also contains a high viscosity fraction of chains with a relaxation time of 100 seconds, such as at least 0.7. Chains with long relaxation times can not relax during the cycle time of the small angle oscillatory shear experiment and lead to high zero shear viscosities.

In addition, the present in-reactor blend has a strain hardening index (SHI) of at least 1.8, typically at least 2.0, such as at least 2.5.

Other typical properties of the present in-reactor polymer blend include:
- weight averaged molecular weight of at least 150,000 g/mol.
- heat of fusion, $\Delta Hf$, of 80 J/g or less, such as 20 to 80 J/g, preferably 70 J/g or less, such as 30 to 70 J/g.
- at least 90 wt %, such as at least 95 wt %, and normally 100 wt %, of the blend is soluble in refluxing xylene.
- a stress at break (as measured by ASTM D638 at 23° C.) of at least 14 MPa. Stress at break is defined as the maximum stress in the stress-strain curve.
- strain at break (as measured by ASTM D638 at 23° C.) of at least 4.

Process for Producing the Polymer Blend

The in-reactor polymer blend described herein may be produced by initially contacting propylene alone in a first reaction stage with a polymerization catalyst capable of producing a crystalline polypropylene having a crystallinity of 20% or more. At least part of the contents of the first reaction stage are then subjected to a second reaction stage together with ethylene and optionally with additional propylene so as to produce a semi-crystalline ethylene/propylene copolymer in the presence of polypropylene produced.

In one embodiment, the second reaction stage employs the same catalyst system as the first reaction stage, with no additional catalyst being supplied to the second reaction stage. Alternatively, an additional amount of the same catalyst system as used in the first reaction stage can be fed to the second reaction stage. Generally between about 10% and about 90%, such as between about 20% and about 80%, for example between about 30% and about 70% of the total catalyst is supplied to the first reaction stage, with the remainder being supplied to the second reaction stage. The molar ratio of the catalyst supplied to the first reaction stage to the catalyst supplied to the second reaction stage depends on the end-use requirements of the in-reactor polymer blend.

In another embodiment, the catalyst system includes a first polymerization catalyst fed to the first reaction stage, and a second polymerization catalyst different from the first catalyst and capable of producing a poly-alpha-olefin having a crystallinity of 5% or more fed to the second reaction stage. The molar ratio of the first polymerization catalyst to the second polymerization catalyst is generally from 5:95 to 95:5 depending on the application and other process variables. The resultant intimate mixing among the different components of the in-reactor produced polymer blend provides excellent interface bonding and enhanced mechanical properties.

Typically, all the propylene is fed into the first reaction stage. Alternatively, the propylene feed is split between the first and second reaction stages. Generally between about 30% and about 100%, such as between about 40% and about 80%, for example between about 50% and about 70%, such as between about 45% and about 55% of the total propylene is supplied to the first reaction stage, with the remainder being supplied to the second reaction stage. Generally, the molar ratio of propylene to ethylene in the second reaction stage is 1:1 or less, such as from about 0.5:1 to about 0.1:1.

In one embodiment, the catalyst employed to produce the second polymer component is the same as, or is compatible with, the catalyst used to produce the thermoplastic first polymer component. In such a case, the first and second polymerization stages can be conducted sequentially in the same reaction zone or can be effected in separate zones of a multiple-zone reactor, or in separate, series-connected reactors, with the entire effluent from the first polymerization zone, including any active catalyst, being transferred to the second polymerization zone. Additional catalyst can then be added, as necessary to the second polymerization stage. In one embodiment, the present process is conducted in two or more series-connected, continuous flow, stirred tank or tubular reactors using metallocene catalysts.

As described above, the contents of the first reactor stage can be transferred to the second reactor stage, and become a part of the reaction medium in the second reactor stage. The catalyst system employed in the first reactor stage is still active to continue the polymerization reaction in the second reactor stage. Alternatively, a part or all of the solvent and unreacted monomers are removed from the polymerization effluent in the first reactor stage, and the polymer, and remaining solvent and monomers are transferred into the second reactor stage. This can be implemented in a system with two reactors in series and a primary separator in between the two reactors. This process scheme also allows independent control of polymerization temperature in the first and second polymerization stages.

It is to be appreciated that, although the foregoing discussion refers only to first and second polymerization stages, further reaction stages could be employed, with the feed to the second reaction stage being split between the additional reaction stages. However, from an economic viewpoint, such additional reaction stages tend to add cost.

Polymers with bimodal distributions of molecular weight and composition can be produced by the present polymerization process by, for example, controlling the polymerization conditions in the first and the second polymerization stages and/or by selecting the catalysts for the first and the second polymerizations, such as by using multiple catalysts in each polymerization stage. Bimodal distributions of molecular weight and composition of the second polymer can also be obtained when different catalysts are used in the first and second polymerization stages and the catalyst employed in the first polymerization stage is transferred into the second polymerization stage for production of the branched block polymers.

The amount of second polymer relative to the first polymer may vary widely depending on the nature of the polymers and the intended use of the final polymer blend. In particular, however, one advantage of the present process is the ability to be able to produce a polymer blend in which the second polymer comprises more than 50 wt %, such as more than 60 wt %, for example more than 70 wt % of the total polymer blend.

In an alternative embodiment, the first step of polymerization is replaced by the use of a pre-made polymer, at least part of which has reactive polymerizable chain ends. The pre-made polymer can be produced in a separate system or can be a commercially available product. The crystalline thermoplastic polymer can be dissolved in a solvent and then added into a reaction medium for the second polymerization step. The crystalline thermoplastic polymer can be also ground into fine powder and then added into the reaction medium for the second polymerization step.

Any known polymerization process may be used to produce the present polymer blend. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, chain shuttling agents (such as diethyl zinc), scavengers, or other such additives as deemed applicable. By continuous process is meant that there is continuous addition to, and withdrawal of reactants and products from, the reactor system. Continuous processes can be operated in steady state, i.e., the composition of effluent remains fixed with time if the flow rate, temperature/pressure and feed composition remain invariant. For example a continuous process to produce a polymer would be one where the reactants are continuously introduced into one or more reactors and polymer product is continuously withdrawn.

Preferably, the polymerization is conducted in a continuous, stirred tank reactor. Tubular reactors equipped with the hardware to introduce feeds, catalysts and scavengers in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutane, mixed butanes, hexane, pentane, isopentane, isohexane, cyclohexane, isooctane, and octane. In an alternate embodiment a perfluorocarbon or hydrofluorocarbon is used as the solvent or diluent.

In one embodiment, the first polymerization stage is conducted by slurry polymerization and the second polymerization stage is conducted by a continuous solution process.

The polymerization process conditions are generally selected to promote the production of reactive macromonomers in the first polymerization step and the incorporation of side branches into the backbone in the second polymerization step. For some metallocene catalysts, high polymerization temperatures in the first polymerization step enhance the population of reactive macromonomer polypropylenes. The reactive macromonomers also need to be soluble in the reaction medium in the second polymerization step so that they can re-incorporate into growing chains when a solution process is employed. Adequate mixing is also important in the second polymerization step to ensure proper contact of the reactive macromonomers with the growing backbone molecules. Higher monomer conversion or low monomer concentration in the second polymerization step also boosts reactive macromonomer incorporation over monomer insertion.

Suitable conditions for polymerization in each reaction stage include a temperature from about 50 to about 250° C., such as from about 50 to about 150° C., for example from about 70 to about 150° C. and a pressure of 0.1 MPa or more, such as 2 MPa or more. The upper pressure limit is not critically constrained but is typically 200 MPa or less, such as 120 MPa or less, except when operating in supercritical phase then the pressure and temperature are above the critical point of the reaction media in question (typically over 95° C. and 4.6 MPa for propylene polymerizations). For more information on running supercritical polymerizations, see International Patent Publication No. WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

Generally the temperature employed in the second reaction zone is lower than the temperature employed in the first reaction zone, typically by at least 10° C., such as at least 20° C. In one embodiment, the temperature employed in the first reaction zone is between about 80° C. and about 140° C. and the temperature employed in the second reaction zone is between about 70° C. and about 120° C.

A polymer can be recovered from the effluent of either the first polymerization step or the second polymerization step by separating the polymer from other constituents of the effluent using conventional separation means. For example, polymer can be recovered from either effluent by coagulation with a non-solvent such as methanol, isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

The catalyst employed in the first reaction stage should to able to produce polymers with reactive unsaturated chain ends, preferably at least 40% of vinyl unsaturation based on the total unsaturated olefin chain ends (alternately at least 50%, alternately at least 60%), while the catalyst used in the second reaction stage should be capable of incorporating the polymerizable macromonomer into a growing chain to form branched block polymers. The catalysts can be in the form of a homogeneous solution, supported, or a combination thereof. A wide variety of transition metals compounds are known that, when activated with a suitable activator, will polymerize alpha-olefins selectively to produce either crystalline polymers or amorphous polymers. For a full discussion of such compounds reference is directed to International Patent Publication No. WO 2004/046214, published Jun. 3, 2004, the entire contents of which are incorporated herein by reference.

Preferably the first propylene homopolymer is made with a polymerization catalyst, such as an activated metallocene catalyst, which forms essentially or substantially isotactic propylene sequences.

Suitable metallocene catalysts capable of producing crystalline poly-alpha-olefins, such as crystalline propylene homopolymers, include those obeying the following general formula (1):

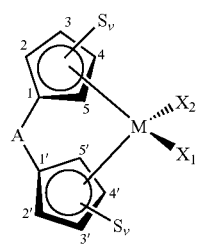

Formula (1)

wherein
M is a Group 3, 4, 5 or 6 transition metal atom, or a lanthanide metal atom, or actinide metal atom, preferably a Group 4 transition metal atom selected from titanium, zirconium or hafnium; each cyclopentadienyl (Cp) ring is substituted with from zero to four substituent groups $S_v$, each substituent group $S_v$ being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent $S_v$ groups may be joined to form a $C_4$ to $C_{20}$ ring to give a saturated or unsaturated polycyclic ligand, wherein the subscript "v" denotes the carbon atom on the Cp-ring to which the substituent is bonded; A is a bridging group; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring, preferably $X_1$ and $X_2$ are halogen or hydrocarbyl radicals, such as chloride, bromide, methyl, ethyl, propyl, or butyl).

Conveniently, A is a bridging group containing boron or a Group 14, 15 or 16 element. Examples of suitable bridging groups include $R'_2C$, $R'_2Si$, $R'_2Ge$, $R'_2CCR'_2$, $R'_2CCR'_2CR'_2$, $R'_2CCR'_2CR'_2CR'_2$, $R'C=CR'$, $R'C=CR'CR'_2$, $R'_2CCR'=CR'CR'_2$, $R'C=CR'CR'=CR'$, $R'C=CR'CR'_2CR'_2$, $R'_2CSiR'_2$, $R'_2SiSiR'_2$, $R'_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C—BR'$, $R'_2C—BR'—CR'_2$, $R'N$, $R'P$, O, S, Se, $R'_2C—O—CR'_2$, $R'_2CR'_2C—O—CR'_2CR'_2$, $R'_2C—O—CR'_2CR'_2$, $R'_2C—O—CR'=CR'$, $R'_2C—S—CR'_2$, $R'_2CR'_2C—S—CR'_2CR'_2$, $R'_2C—S—CR'_2CR'_2$, $R'_2C—S—CR'=CR'$, $R'_2C—Se—CR'_2$, $R'_2CR'_2C—Se—CR'_2CR'_2$, $R'_2C—Se—CR'_2CR'_2$, $R'_2C—Se—CR'=CR'$, $R'_2C—N=CR'$, $R'_2C—NR'—CR'_2$, $R'_2C—NR'—CR'_2CR'_2$, $R'_2C—NR'—CR'=CR'$, $R'_2CR'_2C—NR'—CR'_2CR'_2$, $R'_2C—P=CR'$, and $R'_2C—PR'—CR'_2$ where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group Y include $CH_2$, $CH_2CH_2$, $C(CH_3)_2$, O, S, $SiMe_2$, $SiPh_2$, $SiMePh$, $Si(CH_2)_3$ and $Si(CH_2)_4$.

Preferred transition metal compounds for producing poly-alpha-olefins having enhanced isotactic character are those of formula 1 where the $S_v$ groups are independently chosen such that the metallocene framework 1) has no plane of symmetry containing the metal center, and 2) has a $C_2$-axis of symmetry through the metal center. These complexes, such as rac-$Me_2Si$(indenyl)$_2ZrMe_2$ and rac-$Me_2Si$(indenyl)$_2HfMe_2$, are well known in the art and generally produce isotactic polymers with high degrees of stereoregularity. Similarly another preferred class of transition metal compounds that can produce isotactic polymers useful herein are the monocyclopentadienyl catalysts disclosed in U.S. Pat. No. 5,026,798, which is incorporated by reference herein. A detailed description of suitable catalyst compounds and catalyst selections may be found in U.S. Published Patent Application No. 2004/0217614, published Jul. 1, 2004, which is incorporated by reference herein.

Similarly, transition metal compounds providing tacticity control exist where the $S_v$ substituents of sufficient steric bulk to restrict rotation of the cyclopentadienyl ligands such that the aforementioned symmetry conditions are satisfied. Preferable chiral racemic metallocenes of this type include bis(tricyclo[5.2.1.0$^{2,6}$]deca-2,5-dienyl) zirconium and -hafnium dimethyl, bis((1R)-9,9-dimethyltricyclo[6.1.1.0$^{2,6}$]deca-2,5-dienyl) zirconium dimethyl, bis(tricyclo[5.2.1.0$^{2,6}$]deca-2,5,8-trienyl) zirconium dimethyl, bis(tricyclo[5.2.2.0$^{2,6}$]undeca-2,5,8-trienyl)zirconium and hafnium dimethyl and bis((1R,8R)-7,7,9,9-tetramethyl[6.1.1.0$^{2,6}$]deca-2,5-dienyl) zirconium and hafnium dimethyl.

Particularly preferred transition metal compounds for producing crystalline poly-alpha-olefins are racemic metallocenes, such as rac-dimethylsiladiyl(2-isopropyl, 4-phenylindenyl)$_2$ zirconium dichloride; rac-dimethylsiladiyl(2-isopropyl, 4-[1-naphthyl]indenyl)$_2$ zirconium dichloride; rac-dimethylsiladiyl(2-isopropyl, 4-[3,5-dimethylphenyl]indenyl)$_2$ zirconium dichloride; rac-dimethylsiladiyl(2-isopropyl, 4-[ortho-methyl-phenyl]indenyl)$_2$ zirconium dichloride; rac-dimethylsilyl bis-(2-methyl, 4-phenylindenyl)zirconium dichloride, rac dimethylsiladlyl bis-(2-methyl, 4-napthylindenyl)zirconium dichloride, rac-dimethyl siladlyl bis-(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride and rac-biphenyl siladiyl(2-isopropyl, 4-[3,5 di-t-butyl-phenyl]indenyl)$_2$ zirconium dichloride. Alkylated variants of these metallocenes (e.g. di-methyl instead of dichloride) are also contemplated, dictated by the choice of catalyst activation system. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

Suitable transition metal compounds for the production of poly-alpha-olefins having enhanced syndiotactic character are those of formula 1 where the $S_v$ substituents are independently chosen such that the Cp ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the A and E ligands that renders each to be symmetrical with respect to the Y bridging group but different with respect to each other thereby controlling the approach of each successive monomer unit that is added to the polymer chain. The steric difference between the A and E ligands act to block the approaching monomer from a random approach such that the monomer is added to the polymer chain in the syndiotactic configuration.

Preferable transition metal compounds for the production of syndiotactic polymers are those of formula 1 where the $S_v$ substituents are independently chosen such that 1) the steric difference between the A and E ligands is maximized and 2) there remains a plane of symmetry through the metal center and the $C_1$ and $C_{1'}$ carbon atoms of the Cp-rings in formula 1. Thus, complexes such as $Me_2C(\eta^5—C_5H_4)$(1-fluorenyl)$MMe_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5,10,10,11,11-octahydrodibenzo[b,h]fluorene. Because precatalysts of this type often lose their ability to control the stereoregularity of the polymer under high temperature reaction conditions, to insure higher crystallinity in the material requires using these catalysts at lower reactor temperatures, preferably at temperatures below 80° C.

Suitable transition metal compounds for producing the second polymer component of the in-reactor blend are monocyclopentadienyl transition metal compounds obeying the formula (2):

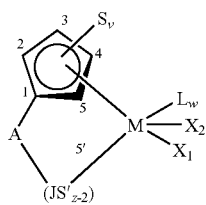

Formula (2)

wherein M is a Group 3, 4, 5 or 6 transition metal atom, or a lanthanide metal atom, or actinide metal atom, preferably a Group 4 transition metal atom selected from titanium, zirconium or hafnium; $S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); $(JS'_{z-2})$ is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J; A is a bridging group as defined above; $X_1$ and $X_2$ are the same as in formula 1; L is an olefin, diolefin, aryne, amine, phosphine, ether, or sulfide ligand, or any other neutral Lewis base; provided L can also be a second transition metal compound of the same type such that the two metal centers M and M* are bridged by $X_1$ and $X'_1$, wherein M* has the same meaning as M, $X'_1$ has the same meaning as $X_1$, and w is an integer from 0 to 3.

"Symmetrically substituted" in relation to the S ligands in formula (2) is defined to mean that the cyclopentadienyl ring is substituted in the 2 and 5 positions and/or 3 and 4 positions with $S_v$ groups that are of approximately of the same steric bulk. Typically the size of these $S_v$ groups is within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_v$ groups and be considered symmetric as long as each of the symmetrical pairs is of similar steric bulk. Additionally, two adjacent $S_v$ groups in the 3 and 4 position may be linked to form a ring provided that the new ring is also symmetrically substituted.

Catalyst systems including transition metal compounds of the type defined by formula (2) are known to impart 2,1-mistakes when incorporating C3 and higher alpha-olefins. The compounds where S' is bonded to a nitrogen ligand (J) via a tertiary carbon (for example when S' is tert-butyl or 1-adamantyl) have fewer 2,1-mistakes than when S' is bonded to the nitrogen ligand (J) via a primary carbon (for example when S' is n-butyl, methyl, or benzyl) or secondary carbon (for example when S' is cyclododecyl, cyclohexyl, or sec-butyl). The 2,1-mistakes in the polymer backbone impart $(CH_2)_2$ units that can be beneficial to the polymer properties. Polymers of this type, the characterization of such polymers and the catalyst systems used to produce such polymers are described in U.S. Pat. No. 5,723,560, which is incorporated herein by reference. Lower Mw versions of such polymers can be produced by changing process condition, for example, by increasing reactor temperature.

Illustrative, but not limiting examples of preferred monocyclopentadienyl metallocenes of the type described in formula (2) above are:

μ-$(CH_3)_2$Si(cyclopentadienyl)(1-adamantylamido)M(R)$_2$
μ-$(CH_3)_2$Si(3-tertbutylcyclopentadienyl)(1-adamantylamido)M(R)$_2$
μ-$(CH_3)_2$Si(tetramethylcyclopentadienyl)(1-adamantylamido)M(R)$_2$
μ-$(CH_3)_2$C(tetramethylcyclopentadienyl)(1-adamantylamido)M(R)$_2$
μ-$(CH_3)_2$Si(tetramethylcyclopentadienyl)(1-tertbutylamido)M(R)$_2$
μ-$(CH_3)_2$Si(fluorenyl)(1-tertbutylamido)M(R)$_2$
μ-$(CH_3)_2$Si(tetramethylcyclopentadienyl)(1-cyclododecylamido)M(R)$_2$
μ-$(CH_3)_2$C(tetramethylcyclopentadienyl)(1-cyclododecylamido)M(R)$_2$ wherein M is selected from a group consisting of Ti, Zr, and Hf and wherein R is selected from Cl and $CH_3$.

Additionally, some catalysts that produce syndiotactic poly-alpha-olefin at lower temperatures, will produce virtually non-crystalline poly-alpha-olefins at higher temperatures. Preferred transition metal compounds of this type are illustrated in formula (3):

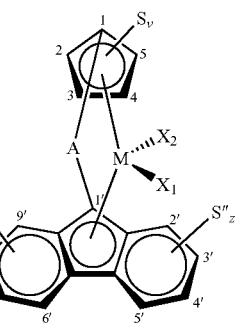

Formula (3)

wherein M is a Group 3, 4, 5 or 6 transition metal atom, or a lanthanide metal atom, or actinide metal atom, particularly a Group 4 transition metal atom selected from titanium, zirconium or hafnium; $S_v$ is the same as in formula 1 where the subscript "v" denotes the carbon atom on the cyclopentadienyl ring to which the substituent is bonded and where there can be zero, two or four substituents, $S_v$, on the cyclopentadienyl ring provided that the cyclopentadienyl ring is symmetrically substituted (as defined below); each substituent group S" is, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S" groups may joined to form a $C_4$ to $C_{20}$ ring to give a saturated or unsaturated polycyclic ligand; subscript "z" denotes the carbon atom on the fluorenyl ring to which the substituent is bonded and where there can be zero to seven substituents, S", on the fluorenyl ring; and A is a bridging group as defined above, $X_1$ and $X_2$ are as defined above.

"Symmetrically substituted" in relation to the $S_y$ ligands in formula (3) is defined to mean that the cyclopentadienyl ring is substituted in the 2 and 5 positions and/or 3 and 4 positions with $S_y$ groups that are of approximately of the same steric bulk. Typically the sizes of these $S_y$ groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with $S_y$ groups and be considered symmetric as long as each of the symmetrical pairs are of similar steric bulk. Additionally, two adjacent $S_y$ groups in the 3 and 4 position may be linked to form a ring provided that the new ring is also symmetrically substituted.

Preferably metallocene precursors for producing poly-alpha-olefins having largely amorphous character (when used as catalysts under higher reactor temperature conditions) are those of formula (3) where $S_y$ are independently chosen such that the metallocene framework has a plane of symmetry containing the metal center and bisecting the Flu- and Cp-rings. The A ligand need not be symmetrical—for example dimethylsilyl or methylphenylsilyl will not effect the stereochemisty of the polymer produced. Because of the distant placement of the S" substituents on the fluorenyl ring, these substituents need not be symmetrically placed on the fluorenyl ring. Hence, the fluorenyl ring may be substituted with up to 7 substituents that may be the same or different.

Illustrative, but not limiting examples of preferred unsymmetrical cyclopentadienyl metallocenes of the type described in formula (3) above for the invention are:

µ-$(C_6H_5)_2$C(cyclopentadienyl)(fluorenyl)M(R)$_2$
µ-$(C_6H_5)_2$C(3-methylcyclopentadienyl)(fluorenyl)M(R)$_2$
µ-$(CH_3)_2$C(cyclopentadienyl)(fluorenyl)M(R)$_2$
µ-$(C_6H_5)_2$C(cyclopentadienyl)(2-methylindenyl)M(CH$_3$)$_2$
µ-$(C_6H_5)_2$C(3-methylcyclopentadienyl)(2-methylindenyl)M(Cl)$_2$
µ-(p-triethylsilylphenyl)$_2$C(cyclopentadienyl)(3,8-di-t-butylfluorenyl) M(R)$_2$
µ-$(C_6H_5)_2$C(cyclopentadienyl)(2,7-dimethylindenyl)M(R)$_2$
µ-$(CH_3)_2$C(cyclopentadienyl)(2,7-dimethylindenyl)M(R)$_2$.
wherein M is chosen from the group consisting of Zr and Hf and R is chosen from the group consisting of Cl and CH$_3$.

Additionally, compounds of formula (4) may be used to produce the amorphous polymer component:

Formula (4)

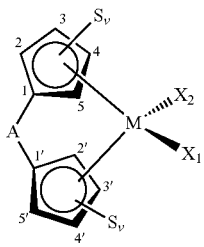

wherein M is a Group 3, 4, 5 or 6 transition metal atom, or a lanthanide metal atom, or actinide metal atom, preferably a Group 4 transition metal atom selected from titanium, zirconium or hafnium; $S_y$ is the same as in formula 1 where the subscript "v" denotes the carbon atom on each cyclopentadienyl ring to which the substituent is bonded and where there can be zero to four substituents, $S_y$, on each cyclopentadienyl ring provided that the cyclopentadienyl rings are symmetrically substituted (as defined below); and A, $X_1$ and $X_2$ are the same as defined in formula 1.

"Symmetrically substituted" in relation to the $S_y$ ligands in formula (4) is defined to mean that the metallocene framework has a plane of symmetry that bisects M and A. Thus, where the cyclopentadienyl rings include substituents, they should be substituted in the 2 and 2' positions and/or 3 and 3' positions and/or 4 and 4' positions and/or 5 and 5' positions with S groups that are of approximately of the same steric bulk. Typically the sizes of these $S_y$ groups are within 2 carbons of each other. Thus cyclopentadienyl rings substituted at the 2 and the 2' positions with methyl and ethyl respectively, or substituted at the 3 and the 3' positions with hexyl and octyl respectively, would be considered symmetrical. Likewise, the cyclopentadienyl rings may be substituted at all four sites with $S_y$ groups and be considered symmetrical as long as each of the symmetrical pairs are of similar steric bulk. Additionally, two adjacent $S_y$ groups may be linked to form a ring provided that the new ring is also symmetrically substituted.

Illustrative, but not limiting examples of preferred transition metal compounds of formula (4) are the racemic isomers of:

µ-$(CH_3)_2$Si(indenyl)$_2$M(Cl)$_2$
µ-$(CH_3)_2$Si(indenyl)$_2$M(CH$_3$)$_2$
µ-$(CH_3)_2$Si(tetrahydroindenyl)$_2$M(Cl)$_2$
µ-$(CH_3)_2$Si(tetrahydroindenyl)$_2$M(CH$_3$)$_2$
µ-$(CH_3)_2$Si(indenyl)$_2$M(CH$_2$CH$_3$)$_2$
µ-$(C_6H_5)_2$C(indenyl)$_2$M(CH$_3$)$_2$
wherein M is chosen from a group consisting of Zr and Hf.

The transition metal compounds described above are typically activated in various ways to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

Alumoxanes are generally oligomeric compounds containing —Al(R$^1$)—O— sub-units, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

Alumoxanes may be produced by the hydrolysis of the respective trialkylaluminum compound. MMAO may be produced by the hydrolysis of trimethylaluminum and a higher trialkylaluminum such as tri-iso-butylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European Publications EP-A-0 561 476, EP-B-0 279 586, EP-A-0 594-218 and EP-B1-0 586 665, and PCT Publication Nos. WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another particularly useful alumoxane is a modified methyl alumoxane (MMAO) cocatalyst type 3A (commercially available from Akzo Chemicals, Inc. under the trade name Modified Methylalumoxane type 3A, and disclosed in U.S. Pat. No. 5,041,584).

In addition to or in place of alumoxanes, the transition metal compounds described herein can be activated using ionizing or stoichiometric activator, neutral or ionic, such as tri(n-butyl)ammonium tetrakis(pentafluorophenyl)boron, a trisperfluorophenyl boron metalloid precursor or a trisperfluoronapthyl boron metalloid precursor, polyhalogenated heteroborane anions (WO 98/43983), boric acid (U.S. Pat. No. 5,942,459) or combination thereof.

Examples of neutral stoichiometric activators include trisubstituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Examples of neutral stoichiometric activators include trisubstituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference. Ionic catalysts can be preparedly reacting a transition metal compound with a neutral Lewis acid, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic, and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

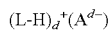

wherein L is an neutral Lewis base; H is hydrogen; $(L-H)^+$ is a Bronsted acid; $A^{d-}$ is a non-coordinating anion having the charge d−; and d is an integer from 1 to 3, e.g. 1, 2 or 3.

The cation component, $(L-H)_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The anion component, $A^{d-}$, may include an anion having the formula $[M^{k+}Q_n]^{d-}$ wherein k is an integer from 1 to 3; n is an integer from 2-6; n−k=d; M is an element selected from Group 13 of the Periodic Table of the Elements, particularly boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of the ionic stoichiometric activator $(L-H)_d^+ (A^{d-})$ is N,N-dimethylanilinium tetra(perfluorophenyl)borate, N,N-dimethylanilinium tetrakis (perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3, 5-bis(trifluoromethyl)phenyl)borate, or triphenylcarbenium tetra(perfluorophenyl)borate.

In one embodiment, an activation method using ionizing ionic compounds not containing an active proton but capable of producing a bulky ligand metallocene catalyst cation and their non-coordinating anion may be employed, such as is described in EP-A-0 426 637, EP-A-0 573 403 and U.S. Pat. No. 5,387,568, which are all herein incorporated by reference. The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in the present process are those that are compatible, stabilize the metallocene cation in the sense of balancing its ionic charge at +1, and yet retain sufficient lability to permit displacement by an ethylenically or acetylenically unsaturated monomer during polymerization. These types of cocatalysts sometimes use tri-isobutyl aluminum or tri-octyl aluminum as a scavenger.

The polymerization process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

When two transition metal compound based catalysts are used in one reactor as a mixed catalyst system, the two transition metal compounds should be chosen such that the two are compatible. A simple screening method such as by $^1$H or $^{13}$C NMR, known to those of ordinary skill in the art, can be used to determine which transition metal compounds are compatible.

It is preferable to use the same activator for the transition metal compounds, however, two different activators, such as a non-coordinating anion activator and an alumoxane, can be used in combination. If one or more transition metal compounds contain an $X_1$ or $X_2$ ligand which is not a hydride, hydrocarbyl, or substituted hydrocarbyl, then the alumoxane should be contacted with the transition metal compounds prior to addition of the non-coordinating anion activator.

The catalyst systems used to produce the present copolymer may also include a support material or carrier. For example, the one or more catalyst components and/or one or more activators may be deposited on, contacted with, vaporized with, bonded to, or incorporated within, adsorbed or absorbed in, or on, one or more supports or carriers. The support material may be any of the conventional support materials. Preferably the support material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Typical support materials are inorganic oxides that include those Group 2, 3, 4, 5, 13 or 14 metal oxides, such as silica, which may or may not be dehydrated, fumed silica, alumina (WO 99/60033), silica-alumina and mixtures thereof. Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference.

When present, the support material typically has a surface area in the range of from about 10 to about 700 m$^2$/g, pore volume in the range of from about 0.1 to about 4.0 cc/g and average particle size in the range of from about 5 to about 500 µm. More preferably, the surface area of the support material is in the range of from about 50 to about 500 m$^2$/g, pore volume of from about 0.5 to about 3.5 cc/g and average particle size of from about 10 to about 200 µm. Most preferably the surface area of the support material is in the range is from about 100 to about 400 m$^2$/g, pore volume from about 0.8 to about 3.0 cc/g and average particle size is from about 5 to about 100 µm. The average pore size of the support material is typically in the range of from 10 to 1000 Å, preferably 50 to about 500 Å, and most preferably 75 to about 350 Å.

Additives

The in-reactor polymer blend described herein may optionally be combined with one or more polymer additives known in the art, such as reinforcing and non-reinforcing fillers, scratch resistant agents, plasticizers, antioxidants, stabilizers, extender oils, lubricants, antiblocking agents, antistatic agents, waxes, foaming agents, pigments, flame retardants and other processing aids known in the polymer compounding art. Such additives may comprise up to about 70 weight percent, more preferably up to about 65 weight percent, of the total composition. Fillers and extenders which can be utilized include conventional inorganics such as calcium carbonate, clays, silica, talc, titanium dioxide, carbon black and the like. The polymer processing oils generally are paraffinic, naphthenic or aromatic oils derived from petroleum fractions. The oils are selected from those ordinarily used in conjunction with the specific rubber or rubber component present in the composition.

The additives such as fillers and oils can be introduced into the in-reactor polymer blend during the polymerization in either the first polymerization zone or the second polymerization zone. The additives can be added into the effluent from the second polymerization zone but are preferably added into the polymer blend after removal of solvent or diluent through melt blending.

Additional polymers can also be added to form blends. In one or more embodiments, the additional polymers include thermoplastic resins or thermoplastic elastomers. Exemplary thermoplastic resins include crystalline polyolefins. Also, suitable thermoplastic resins may include copolymers of polyolefins with styrene, such as a styrene-ethylene copolymer. In one or more embodiments, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the homo-polypropylene, impact, and random copolymers of propylene with ethylene or the higher α-olefins, described above. Preferably, the homopolypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight (Mw) of at least 50,000, alternatively at least 100,000. Comonomer contents for these propylene copolymers will typically be from 1 to about 30% by weight of the polymer (See, for example, U.S. Pat. Nos. 6,268,438, 6,288,171, and 6,245,856). Copolymers available under the trade name VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Uses of the In-Reactor Polymer Blends

The in-reactor polymer blends described herein may be shaped into desirable end use articles by any suitable means known in the art. They are particularly useful for making articles by injection molding, blow molding, film blowing, fiber spinning, extrusion, thermoforming, gas foaming, elasto-welding and compression molding techniques.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

One embodiment of an injection molding process useful herein is described as follows. The shaped laminate is placed into the injection molding tool. The mold is closed and the substrate material is injected into the mold. The substrate material is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 μm to 2540 μm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 μm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material in injection molded into a tool including the shaped laminate, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, the an extruded sheet of the compositions of this invention may be directly thermoformed or blow molded without cooling, thus skipping a cooling step. Other parameters may be varied as well in order to achieve a finished composite article having desirable features.

Preferred articles made using the compositions of this invention include sheets, crates, containers, bottles, packaging, wire and cable jacketing, pipes, geomembranes, tubing, pipes, automotive, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

In another embodiment, this invention relates to:
1. An in-reactor polymer blend comprising (a) a propylene-containing first polymer; and (b) an ethylene-containing second polymer such that the polymer blend comprises between about 50 wt % and about 80 wt % units derived from ethylene and between about 50 wt % and about 20 wt % units derived from propylene and is substantially free of dienes, with the content of ethylene in the second polymer found in the form of ethylene-ethylene-ethylene triads being at least 40%, based on the number of triads in the polymer, and with the in-reactor blend containing at least 0.1 branches having 8 or more carbon atoms per 10,000 carbons of the in-reactor blend, wherein the blend has the following properties:
(a) at least two peaks when subjected to Differential Scanning Calorimetry corresponding to a first melting point of at least 150° C. and a second melting point of at least 40° C. such that the difference between the first and second melting temperatures is at least 20° C.;
(b) a strain hardening index of at least 1.8; and
(c) a shear thinning slope for the log(dynamic viscosity) versus log(frequency) curve of less than −0.2.
2. The blend of paragraph 1 and having a weight averaged molecular weight of at least 150,000 g/mol.
3. The blend of paragraph 1 or 2 and having a heat of fusion, ΔHf, of 80 J/g or less.
4. The blend of paragraph 1 or 2 and having a heat of fusion, ΔHf, of about 20 to about 80 J/g.
5. The blend of paragraph 1, 2, 3, or 4 and having a heat of fusion, ΔHf, of 70 J/g or less.
6. The blend of paragraph 1, 2, 3, or 4 and having a heat of fusion, ΔHf, of about 30 to about 70 J/g.
7. The blend of any of paragraphs 1 to 6, wherein at least 90 wt % of the blend is soluble in refluxing xylene.
8. The blend of any of paragraphs 1 to 7, wherein at least 95 wt % of the blend is soluble in refluxing xylene.
9. The blend of any of paragraphs 1 to 8, wherein 100 wt % of the blend is soluble in refluxing xylene.
10. The blend of any of paragraphs 1 to 9 and having a viscosity fraction of chains with a relaxation time of 100 seconds of at least 0.7.
11. The blend of any of paragraphs 1 to 10 and having a stress at break of at least 14 MPa.
12. The blend of any of paragraphs 1 to 11 and having a strain at break of at least 4.
13. The blend of any of paragraphs 1 to 12 wherein, when fractionated by temperature rising elution fractionation (TREF), the blend produces a) no fraction, or a first fraction having a DSC heat of fusion, ΔHf, of 5 J/g or less, eluting below 10° C., b) a second fraction having a DSC heat of fusion, ΔHf, of 5 to 80 J/g, eluting between 10° C. and 90° C. and c) a third fraction having a DSC melting temperature greater than 140° C. eluting above 90° C.
14. The blend of paragraph 13 wherein the ratio of the volume of said second fraction to the volume of said third fraction is at least 1.5:1.
15. A process for producing the polymer blend of any of paragraphs 1 to 14, the process comprising:
(i) contacting at least one first monomer composition comprising propylene with a first catalyst capable of producing polymer having a crystallinity of 20% or more at the selected polymerization conditions in a first polymerization stage under conditions including a first temperature sufficient to produce the propylene-containing first polymer comprising at least 40% vinyl chain ends; and
(ii) contacting at least part of said first polymer with a second monomer composition comprising ethylene and propylene and with a second catalyst capable of producing polymer having a crystallinity of 5% or more in a second polymerization stage under conditions including a second temperature sufficient to polymerize said second monomer composition to produce the ethylene-containing second polymer, wherein the second temperature is less than the first temperature by at least 10° C.
16. The process of paragraph 15, wherein said first temperature is between about 80° C. and about 140° C.
17. The process of paragraph 15 or 16, wherein the contacting (i) is conducted by slurry polymerization.
18. The process of paragraph 15, 16 or 17 wherein the contacting (ii) is conducted by solution polymerization.
19. The process of paragraph 15, 16, 17 or 18, wherein the molar ratio of propylene to ethylene in the contacting (ii) is 1:1 or less.

20. The process of paragraph 15, 16, 17, 18 or 19 wherein each of the contacting (i) and contacting (ii) is conducted in the presence of a single site catalyst comprising at least one metallocene catalyst and at least one activator.

The invention will now be more particularly described with reference to the accompanying non-limiting Examples.

In the Examples, peak melting point (Tm) and peak crystallization temperature (Tc), glass transition temperature (Tg), and heat of fusion were determined using the following procedure according to ASTM D3418-03. Differential scanning calorimetric (DSC) data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the degree of crystallinity. The percent crystallinity is calculated using the formula, [area under the melting peak (Joules/gram)/B(Joules/gram)]*100, where B is the heat of fusion for the 100% crystalline homopolymer of the major monomer component. These values for B were obtained from the Polymer Handbook, Fourth Edition, published by John Wiley and Sons, New York 1999. A value of 189 J/g (B) was used as the heat of fusion for 100% crystalline polypropylene. A value of 290 J/g is used for the heat of fusion for 100% crystalline polyethylene. The melting and crystallization temperatures reported here were obtained during the second heating/cooling cycle.

For polymers displaying multiple endothermic and exothermic peaks, all the peak crystallization temperatures and peak melting temperatures were reported. The heat of fusion for each endothermic peak was calculated individually. The percent of crystallinity is calculated using the sum of heat of fusion from all endothermic peaks. Prior to the DSC measurement, the sample was aged (typically by holding it at ambient temperature for a period up to about 2 days) or annealed to maximize the level of crystallinity.

Molecular weights (number average molecular weight (Mn), weight average molecular weight (Mw), and z-average molecular weight (Mz)) were determined using a Polymer Laboratories Model 220 high temperature SEC (Size Exclusion Chromatograph) with on-line differential refractive index (DRI), light scattering, and viscometer detectors. It used three Polymer Laboratories PLgel 10 m Mixed-B columns for separation, a flow rate of 0.54 cm$^3$/min, and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P. Brant, R. R. Chance, and W. W. Graessley, in *Macromolecules*, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/ 0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

Proton NMR spectra were collected using a 500 MHz Varian pulsed fourier transform NMR spectrometer equipped with a variable temperature proton detection probe operating at 120° C. The polymer sample is dissolved in 1,1,2,2-tetrachloroethane-d2 (TCE-d2) and transferred into a 5 mm glass NMR tube. Typical acquisition parameters are sweep width=10 KHz, pulse width=30 degrees, acquisition time=2 s, acquisition delay=5 s and number of scans=120. Chemical shifts are determined relative to the TCE-d2 signal which is set to 5.98 ppm.

The chain end unsaturations are measured as follows. The vinyl resonances of interest are between from about 5.0 to 5.1 ppm (VRA), the vinylidene resonances between from about 4.65 to 4.85 ppm (VDRA), the vinylene resonances from about 5.31 to 5.55 ppm (VYRA), the trisubstituted unsaturated species from about 5.11 to 5.30 ppm (TSRA) and the aliphatic region of interest between from about 0 to 2.1 ppm (IA). The number of vinyl groups/1000 Carbons is determined from the formula: (VRA*500)/((IA+VRA+VYRA+VDRA)/2)+TSRA). Likewise, the number of vinylidene groups/1000 Carbons is determined from the formula: (VDRA*500)/((IA+VRA+VYRA+VDRA)/2)+TSRA), the number of vinylene groups/1000 Carbons from the formula (VYRA*500)/((IA+VRA+VYRA+VDRA)/2)+TSRA) and the number of trisubstituted groups from the formula (TSRA*1000)/((IA+VRA+VYRA+VDRA)/2)+TSRA).

VRA, VDRA, VYRA, TSRA and IA are the integrated normalized signal intensities in the chemical shift regions defined above.

The compositions of the in-reactor blends of this invention can also be analyzed using proton NMR and a technique based upon earlier assignments by H. H. Cheng and G. H. Lee (*J. Poly. Sci.: Part B: Poly. Phys.*, 25, 2355-2370 (1987)). Cheng and Lee carried out two-dimensional analysis of ethylene-propylene copolymers and correlated the proton spectra with the $^{13}$C spectra. They developed a method to analyze ethylene-propylene copolymers using Markovian probabilities and fits to the aliphatic region of the proton NMR spectrum. Because the in-reactor blends of this invention typically contain isotactic polypropylene and ethylene-propylene copolymers, they can also be analyzed by fitting two sets of Markovian probabilities. Markovian probabilities (of the 1$^{st}$ order) are the probability of inserting a new monomer of a specific type given the last monomer inserted was of a specific type. For an ethylene-propylene copolymer there are four probabilities: the probability of ethylene after ethylene, the probability of propylene after ethylene, the probability of ethylene after propylene, and the probability of propylene after propylene. There are only two independent probabilities since the probabilities of monomers after ethylene must add to 1 and the probabilities of monomers after propylene must add to 1. For isotactic polypropylene the Markovian probability for inserting propylene after propylene is one and the others are all zero. To analyze the composition of the in-reactor blends, there are four parameters which need to be fit: the moles of polypropylene (molesP), the moles of ethylene/propylene copolymer (molesEP), the probability of a propylene inserting after an ethylene in the copolymer ($\beta$), and the probability of an ethylene inserting after a propylene ($\alpha$). Six peaks are integrated in the aliphatic region of the proton NMR: a. 0.086 to 1.04 ppm, b. 1.10 to 1.25 ppm, c. 1.25 to 1.41 ppm, d. 1.41 to 1.52 ppm, e. 1.52 to 1.6 ppm, and f. 1.6 to 1.72 ppm. These six peak areas are least squares fit with the following formulas written in terms of the four unknowns using the solver in Excel:

a. molesP+molesEP*$\beta$*$(1-\alpha)^2$/$(\alpha+\beta)$
b. molesEP*$2$*$\alpha$*$\beta$*$(1-\alpha)$/$(\alpha+\beta)$
c. molesEP*$\alpha^2$*$\beta$/$(\alpha+\beta)$
d. molesP+molesEP*$(\beta*(1-\alpha)+2\alpha*\beta^2+2\alpha*\beta+4\alpha*\beta*(1-\beta)+2\alpha*(1-\beta)+2\alpha*(1-\beta)^2)$/$(\alpha+\beta)$
e. molesEP*$2\alpha\beta$/$(\alpha+\beta)$
f. 4*molesP+molesEP*$(4\beta-\alpha\beta)$/$(\alpha+\beta)$
   Total area: 6*molesP+molesEP*$(4\alpha+6\beta)$/$(\alpha+\beta)$.

In terms of these unknowns, the mole fraction of ethylene in the ethylene/propylene copolymers is $\alpha/(\alpha+\beta)$ and the mole fraction of propylene in the ethylene/propylene copolymer is $\beta/(\alpha+\beta)$. Mole fraction of isotactic polypropylene in the in-reactor blend is molesP/(molesP+molesEP) and the mole fraction of ethylene/propylene copolymer is molesEP/(molesP+molesEP). With the Markovian probabilities for the ethylene/propylene copolymer, the probability of any triad can be calculated. In particular, the probability of the ethylene-ethylene-ethylene triad occurring in the ethylene/propylene copolymer is given by $\alpha*(1\beta)^2/(\alpha+\beta)$.

In conducting the $^{13}$C NMR investigations, samples are prepared by adding about 0.3 g sample to approximately 3 g of tetrachloroethane-d2 in a 10 mm NMR tube. The samples are dissolved and homogenized by heating the tube and its contents to 150° C. The data are collected using a Varian spectrometer, with corresponding $^1$H frequencies of either 400 or 700. The data are acquired using nominally 4000 transients per data file with a about a 10 second pulse repetition delay. To achieve maximum signal-to-noise for quantitative analysis, multiple data files may be added together. The spectral width was adjusted to include all the NMR resonances of interest and FIDs were collected containing a minimum of 32K data points. The samples are analyzed at 120° C. in a 10 mm broad band probe.

The vinyl groups on the chain ends of polymers in both the first and second polymerizations can insert to make long chain branches. These long chain branches are of the "Y" type, where three chains meet at a single methine carbon. The peaks corresponding to methylenes adjacent to these branch points are found between 44 and 45 ppm. Assignments for long chain branches of iPP chains are discussed by Weng, Hu, Dekmezian, and Ruff (Macromolecules 2002, 35, 3838-3843). For propylene branches between propylenes in the backbone the methylenes are found at 44.88, 44.74, and 44.08 ppm. The methine of the branch is found at 31.84 ppm. For ethylene long chain branches in ethylene, Randall (*Polymer Reviews* 29 (2), pp. 201-317, (1989)) describes a method to measure them. In the polymers of this invention long chain branches between ethylene/propylene chains and isotactic polypropylene chains have been found at 44.68, 44.83, 44.92 ppm.

For in-reactor polymer blends with low content of branched block composition, the blends should be first fractionated using preparative temperature rising elution fractionation (TREF).

Temperature rising elution fractionation (TREF) analysis is conducted using Polymer Char TREF 200 (PolymerChar, Valencia, Spain) equipped with an infrared detector according to the method described by Wilde, L.; Ryle, T. R.; Knobeloch, D. C.; Peat, I. R.; Determination of Branching Distributions in Polyethylene and Ethylene Copolymers, J. Polym. Sci., 20, 441-455 (1982). The polymer samples is first dissolved in 1,2 dichlorobenzene with 400 ppm of butylated hydroxy toluene (BHT) at 160° C. for about 60 minutes at a polymer concentration of 2 to 6 mg/mL. The resulting solution is then introduced into a packed column and stabilized at 140° C. for about 45 minutes. The polymer sample is then allowed to crystallize in the packed column by slowly reducing the temperature to 30 or 0° C. at a cooling rate of 1° C./min. The sample is then first eluted from the column by pumping the solvent through the column at a flow rate of 1.0 ml/min for 10 minutes at 0° C. or 30° C. A TREF chromatogram curve is then generated by eluting the crystallized polymer sample from the column by slowly increasing the temperature of the eluting solvent from 0° C. or 30° C. to 140° C. at a rate of 2° C./min and eluting solvent flow rate of 1.0 ml/min. The concentration of eluted polymer is measured using the infrared detector.

Stress-strain properties, including ultimate tensile strength, elongation at break, and 100% modulus, were determined at room temperature according to ASTM D638 for microtensile specimens. The specimens were cut from compression molded plaques using a mallet handle die. Specimen dimensions were those specified in ASTM D 638. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Initial modulus, stress and strain at yield (where evident), peak stress, tensile strength at break, and strain and elongation at break were calculated. A minimum of five specimens from each plaque was tested, the results being reported as the average value. All stresses quoted were calculated based upon the original cross-sectional area of the specimen, taking no account of reduced cross-section as a function of increasing strain. Stress at break is defined as the maximum tensile stress. The strain hardening index (SHI) is the ratio of the stress at break divided by the yield stress in a stress-strain curve. Yield stresses were calculated by fitting straight lines to the curves in the range of strains from 0.5 to 1.0 and then extrapolating back to a strain of 0.0. The strain at break was the strain where the samples broke.

Small amplitude oscillatory shear (SAOS) rheological data was measured with an Advanced Rheometrics Expansion System (ARES) using parallel plates (diameter=25 mm) at several temperatures (150, 170, 190 and 210° C.) using a pristine compression molded sample at each temperature. The dynamic viscosity measurements were made over the angular frequency ranged from 0.01-100 rad/s. Depending on the molecular weight and temperature, strains of 10% and 15% were used and linearity of the response was verified. A $N_2$ stream was circulated through the sample oven to minimize chain extension or crosslinking during the experiments. All the samples were compression molded at 190° C. and no stabilizers were added. A sinusoidal shear strain is applied to the material if the strain amplitude is sufficiently small the material behaves linearly. It can be shown that the resulting steady-state stress will also oscillate sinusoidally at the same frequency but will be shifted by a phase angle δ with respect to the strain wave. The stress leads the strain by δ. For purely elastic materials δ=0° (stress is in phase with strain) and for purely viscous materials, δ=90° (stress leads the strain by 90° although the stress is in phase with the strain rate). For viscoelastic materials 0<δ<90. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4.

Long chain branching can be observed by small amplitude oscillatory shear testing of the molten polymer performed on a dynamic (oscillatory) rheometer. From, the data generated by such a test it is possible to determine the phase or loss angle δ, which is the inverse tangent of the ratio of G" (the loss modulus) divided by G' (the storage modulus). For a typical linear polymer, the loss angle at low frequencies (or long times) approaches 90 degrees, because the chains can relax in the melt, adsorbing energy, and making the loss modulus much larger than the storage modulus. As frequencies increase, more of the chains relax too slowly to absorb energy during the oscillations, and the storage modulus grows relative to the loss modulus. Eventually, the storage and loss moduli become equal and the loss angle reaches 45 degrees. In contrast, a branched chain polymer relaxes very slowly, because the branches need to retract before the chain backbone can relax along its tube in the melt. This polymer never reaches a state where all its chains can relax during an oscillation, and the loss angle never reaches 90 degrees even at the lowest frequency, ω, of the experiments. The loss angle is also relatively independent of the frequency of the oscillations in the SAOS experiment; another indication that the chains can not relax on these timescales.

In a plot of the phase angle δ versus the measurement frequency ω, polymers that have long chain branches exhibit a plateau in the function of δ(ω), whereas linear polymers do not have such a plateau. According to Garcia-Franco et al. (Macromolecules 2001, 34, No. 10, 3115-3117), the plateau in the aforementioned plot will shift to lower phase angles δ when the amount of long chain branching occurring in the polymer sample increases. Dividing the phase angle at which the plateau occurs by a phase angle of 90°, one obtains the critical relaxation exponent n which can then be used to calculate a gel stiffness using the equation:

$$\eta^*(\omega)=S\Gamma(1-n)\omega^{n-1}$$

wherein η* represents the complex viscosity (Pa*s), ω represents the frequency, S is the gel stiffness, Γ is the gamma function (see Beyer, W. H. Ed., CRC Handbook of Mathematical Sciences 5$^{th}$ Ed., CRC Press, Boca Raton, 1978) and n is the critical relaxation exponent. Polymers produced herein preferably have a gel stiffness of more than 150 Pa*s, preferably at least 300 Pa*s and more preferably at least 500 Pa*s. The gel stiffness is determined at the test temperature of 190° C. A preferred critical relaxation exponent n for the polymers produced herein is less than 0.6, alternately less than 0.5.

Small angle oscillatory shear data can be transformed into discrete relaxation spectra using the procedure on pages 273-275 in R. B. Bird, R. C. Armstrong, and O. Hassager, *Dynamics of Polymeric Liquids, Volume* 1, *Fluid Mechanics*, 2$^{nd}$ *Edition*, John Wiley and Sons, (1987). The storage and loss moduli are simultaneously least squares fit with the functions:

$$G'(\omega_j)=\Sigma\eta_k\lambda_k\omega_j^2/(1+(\eta_k\omega_k)^2)$$

$$G''(\omega_j)=\Sigma\eta_k\omega_j/(1+(\eta_k\omega_k)^2)$$

at the relaxation times $\lambda_k$=0.01, 0.1, 1, 10, and 100 seconds. The sums are from k=1 to k=5. The sum of the $\eta_k$'s is equal to the zero shear viscosity, $\eta_0$. An indication of high levels of cross products is a high value of $\eta_5$, corresponding to the relaxation time of 100 s, relative to the zero shear viscosity. The viscosity fraction of the 100 s relaxation time is $\eta_5$ divided by the zero shear viscosity, $\eta_0$. For the polymers of this invention the viscosity fraction of the 100 s. relaxation time is at least 0.7.

The invention will now be more particularly described with reference to the accompanying drawings and the following, non-limiting Examples.

Example 1

A 2 liter Autoclave Engineers zipperclave reactor was cleaned by washing with toluene for 15 minutes at 100° C. while stirring at 300 RPM. The reactor was dropped and the toluene poured out. The unit was closed back up and a steady nitrogen purge was started through the unit while it was heated up to the maximum temperature allowed by the steam system, approximately 120° C. Purging and heating of the unit was continued for a minimum of 1 hour.

After 1 hour of purging and heating, the unit was cooled down to room temperature while maintaining a steady nitrogen purge. 2 mL of 25 wt % tri(n-octyl)aluminum was cannulated into the unit using $\frac{1}{16}^{th}$ inch tube with a continuous nitrogen purge. 600 mL of hexane were added using a sight glass. Stirring was started at 500 RPM. A solution of 0.64 mg of dimethyl zirconium bis(2-methyl-4-phenylindenyl) and 1.28 mg of dimethyl anilinium tetrakis(heptafluoro-2-naphthyl) borate were mixed and placed in a short section of ¼ inch stainless steel tubing with three way valves and unions on both ends to make a catalyst tube. This catalyst tube was screwed on to the port of the reactor and 200 mL of hexane were used to push the catalyst solution into the reactor. Next, 200 mL, of liquid propylene, were added to the reactor using a sight glass. Reactor temperature was slowly increased to 90° C. using a steam jacket. The polymerization was run for 10 minutes at a pressure of 147 psig (1115 kPa). A 6° C. exotherm was experienced but controlled by an Omega PID controller. The reactor temperature was then reduced to 70° C. It took about 15 minutes to stabilize the temperature. Pressure was reduced to 68 psig (570 kPa). Ethylene was added to the reactor until its pressure reached 420 psig (2997 kPa). The second polymerization ran for 20 minutes. The reactor was cooled to 40° C. and the bottom was dropped. The toluene/polymer was poured into a beaker containing about 500 mL of methanol to quench the reaction. The mixture was filtered and the solids were dried overnight in a vacuum oven at 60° C. Yield was 110.41 g.

Proton NMR composition can be analyzed by fitting Markovian statistics for an isotactic polypropylene plus Markovian statistics for an ethylene/propylene copolymer to the areas measured for the six peaks in the aliphatic region of the spectrum. For Example 1 the composition was 22.1 mol % isotactic polypropylene and 77.9 mol % ethylene/propylene copolymer containing 12.9 mol % propylene and 87.1 mol % ethylene. For the ethylene/propylene copolymer the probability along the chain of going from an ethylene to a propylene was 0.131 and the probability of going from a propylene to an ethylene was 0.882. These transition probabilities can be used to calculate the probabilities of triads as well. In particular, the probability of the ethylene-ethylene-ethylene triad or sequence is 0.658, suggesting that this ethylene/propylene copolymer has a lot of long polyethylene runs in it. This is confirmed by the large peak observed in the differential scanning calorimetry data at 83.86 C. Proton NMR chain end analysis showed 0.06 vinylenes, 0.03 trisubstituted olefins, 0.11 vinyls, and 0.08 vinylidenes per 1000 carbons.

Differential scanning calorimetry on a 3.1 mg sample showed two melting points on the second melt. The peak at 83.86° C. had a heat of fusion of 48.25 J/g and the peak at 157.04° C. had a heat of fusion of 25.42 J/g. The first peak is attributed to polyethylene crystallinity due long methylene runs in the ethylene/propylene copolymer and the second is attributed to isotactic polypropylene crystallinity.

Size exclusion chromatography using differential refractive index, light scattering, and viscosity detectors was also carried out on the product of this Example. The Mn, Mw, and Mz from the light scattering detector were 102K, 209K, and 386K, respectively. The plot of intrinsic viscosity versus molecular weight was nearly linear with a slight downward curvature at very high molecular weights. A small high molecular weight peak was observed in the light scattering chromatogram, suggesting the presence of a small amount of high molecular weight cross product between the iPP and EP polymers.

Analytical temperature elution fractionation, TREF, was carried out and showed two peaks. 72.5% of the area was observed in a peak at 56.7° C., which is attributed to high ethylene crystallinity ethylene/propylene copolymer and 29.1 area % was observed at 108.4° C., which is attributed to isotactic polypropylene. No soluble fraction was observed, suggesting that all the chains of this reactor blend contained at least some crystallinity.

Preparative temperature elution fractionation was carried out and four fractions were collected: 333.4 mg of material at temperatures less than 22° C., 5513.4 mg between the temperatures of 22 and 67° C., 472.0 mg between the temperatures of 67 and 96° C., and 2485.6 mg between 96 and 150° C. The large fraction between 22 and 67° C. is attributed to high ethylene content ethylene/propylene copolymer, while the large fraction between 96 and 150° C. is attributed to isotactic polypropylene. The analytical TREF spectra for these four fractions and for the whole sample of Example 1 polymer are plotted in FIG. 1 and are labeled a-d and all respectively.

Figure 2:
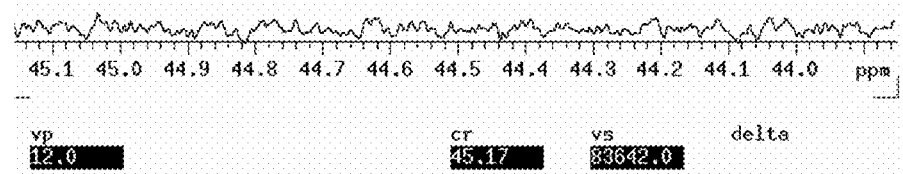
FIG. 2 shows the $^{13}C$ NMR spectra of the fractions obtained after temperature rising elution fractionation of the in-reactor polymer blend of Example 1.
Figure 2:
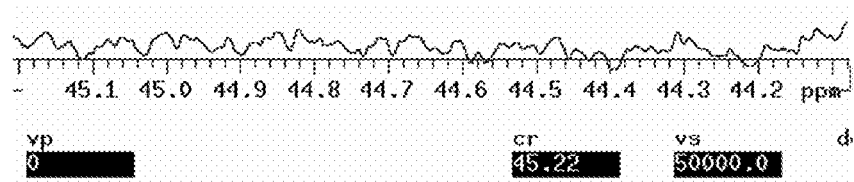
Figure 2:
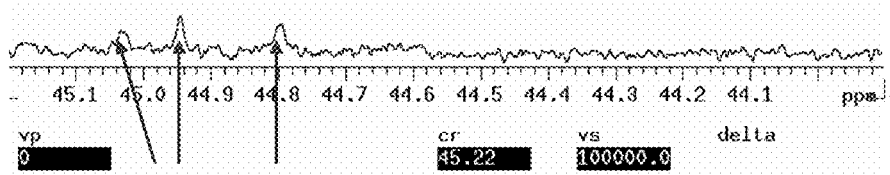

$^{13}$C-NMR spectra were collected for fractions b-d, see FIG. 2, and were analyzed for the presence of long chain branches. The three methylene carbons next to the branch point are known to absorb between 44 and 45 ppm. They are only present in fraction d, collected between 96 and 150° C. The cross products between the isotactic polypropylene and ethylene/propylene copolymers are confirmed and elute in the TREF experiment along with the isotactic polypropylene. Integrating the area under these three small peaks, dividing by three, dividing by the total aliphatic area of the $^{13}$C-NMR spectra, and multiplying by 10000, we can calculate the branches per 10000 carbons of the in-reactor blend in fraction d as 0.42. Using the mass fractions measured in the TREF fractionation, the total number of confirmed branch points in this Example is 0.12 per 10000 carbons. The actual number of branch points could be much higher given the diversity of microstructures possible in such copolymers.

Figure 3:
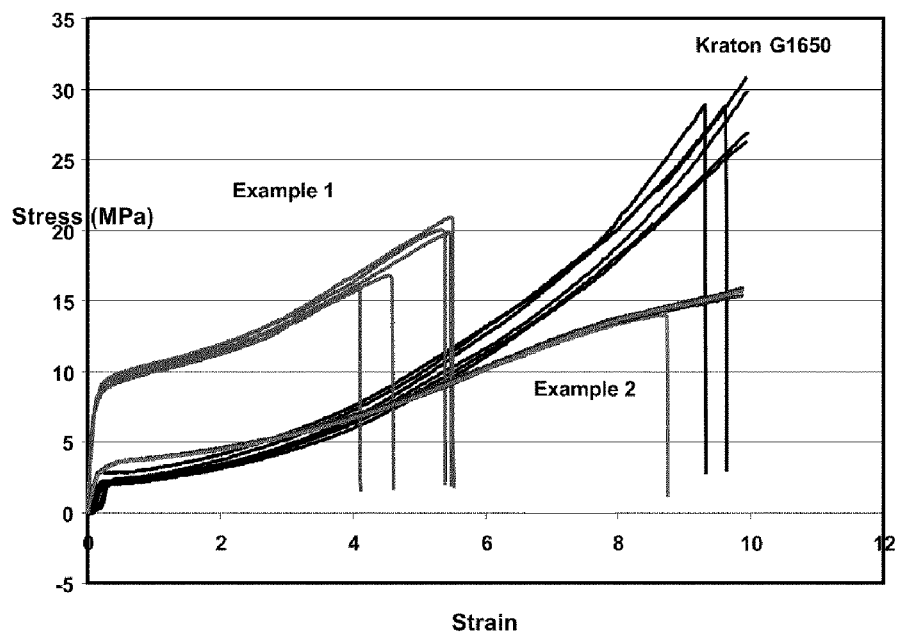
FIG. 3 compares the stress against strain curves for the in-reactor polymer blends of Examples 1 and 2 with that of commercially available styrene-butadiene-styrene block copolymer Kraton G 1650. Each example shows 5 replicates using different pieces of each sample.

Stress-strain curves were collected from the product of Example 1 and are presented in FIG. 3. Five replicas are averaged for the results. The average modulus (initial slope at zero strain) was 103.9 MPa, The yield stress was calculated by fitting a straight line to the stress-strain curves in the range of strains between 0.5 and 1.0 and extrapolating back to zero strain (the intercept of the straight lines). The yield stress was 9.04 MPa for Example 1. The average strain at break was 4.97 and the average stress at break was 18.53 MPa. Strain hardening index is the increase in the stress-strain curves after yielding. It is defined as the stress at break divided by the yield stress. For Example 1, the strain hardening index was 2.05. It is believed that strain hardening is observed because parts of the chains in the reactor blend are immobilized in crystallites or by branch points. The in-reactor blend of Example 1 behaves as a crosslinked elastomer or a thermoplastic elastomer. As seen in FIG. 3, the values of Example 1 are similar to the commercial thermoplastic elastomer Kraton G1650, an hydrogenated styrene-butadiene-styrene terpolymer.

Figure 4:
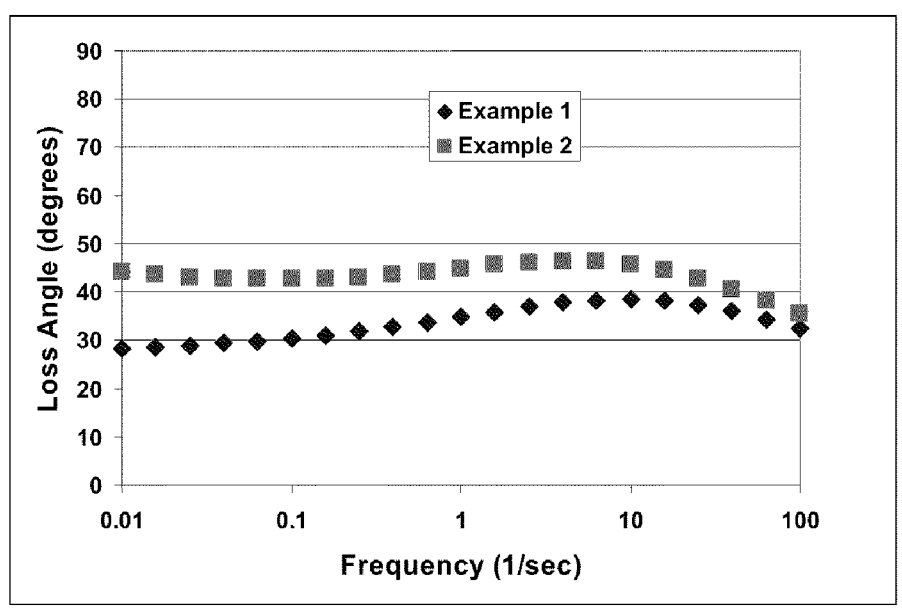
FIG. 4 is a plot of loss angle versus frequency for the in-reactor polymer blends of Examples 1 and 2, both measured at a temperature of 190° C. Lower loss angles indicate greater amounts of long chain branching and cross products.

Small angle oscillatory shear data was collected for Example 1 at 190° C. A plot of loss angle versus frequency is presented in FIG. 4. In this plot the loss angle is the inverse tangent of the storage modulus divided by the loss modulus. For linear polymer chains the polymer melt is fully relaxed at small frequencies or long relaxation times; the storage modulus is much larger than the loss modulus and the loss angles are 90 degrees. For the in-reactor blend of Example 1 the loss modulus is still larger than the storage modulus even at 0.01 sec$^{-1}$. The chains are unable to relax, because of the presence of significant amounts of branching between the isotactic polypropylene chains and the ethylene-propylene copolymers. These effects must be due to branching, because the experiment was carried out at 190° C., above the melting points of both polymers in the blend.

The loss angles are fairly independent of frequency, suggesting the presence of gels in the melt. The curve for the product of Example 1 is almost flat at a value of 28.2 degrees at the lowest frequency measured, making the critical relaxation modulus equal to 0.31. This low critical relaxation modulus is also indicative of cross products or long chain branches in Example 1.

Figure 5:
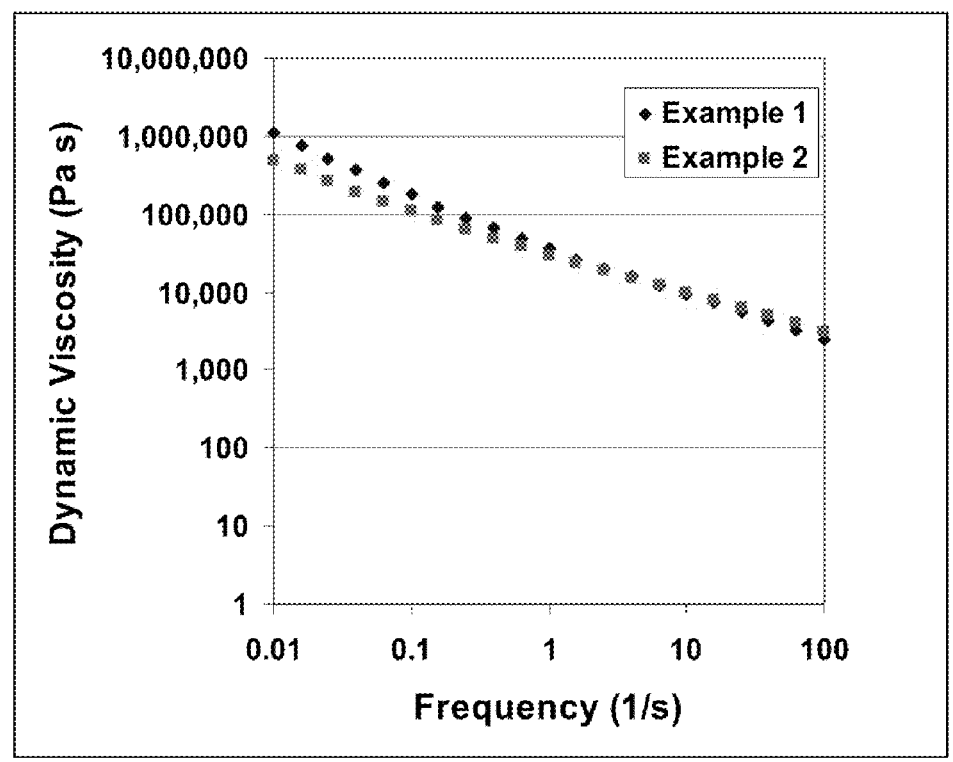
FIG. 5 is a plot of dynamic viscosity versus frequency for the in-reactor polymer blends of Examples 1 and 2, both measured at a temperature of 190° C. Rapid decrease of dynamic shear viscosity is known as shear-thinning and is indicative of long chain branching and cross products.

The dynamic shear viscosity of the product of Example 1 is presented in FIG. 5. This polymer is highly shear thinning. The dynamic viscosity at low shear rates is highly sensitive to those chains in the melt which relax slowly. To quantify how many chains with long relaxation times are present in the melt, the dynamic moduli, G' and G", are fit with a Maxwell model. Using the amount of the chains with 100 second relaxation times divided by the zero shear viscosity, a viscosity fraction of 0.91 is calculated for the chains with 100 second relaxations for the in-reactor blend of Example 1.

Another simple measure of the viscosity shear-thinning in FIG. 5 is the slope of the log(dynamic viscosity) versus log (frequency) plot from a frequency of 0.01 s$^{-1}$ to a frequency of 100 s$^{-1}$. For Example 1 the shear-thinning slope is −0.66. The more negative this slope, the more shear-thinning is present in the melt, and the larger the concentration of slow relaxing chains.

Example 2

A 2 liter Autoclave Engineers zipperclave reactor was cleaned by washing with toluene for 15 minutes at 100° C. while stirring at 300 RPM. The reactor was dropped and the toluene poured out. The unit was closed back up and a steady nitrogen purge was started through the unit while it was heated up to the maximum temperature allowed by the steam system, approximately 120° C. Purging and heating of the unit was continued for a minimum of 1 hour.

After 1 hour of purging and heating, the unit was cooled down to room temperature while maintaining a steady nitrogen purge. 2 mL of 25 wt % tri(n-octyl)aluminum was cannulated into the unit using $\frac{1}{16}^{th}$ inch tube with a continuous nitrogen purge. 600 mL of hexane were added using a sight glass. Stirring was started at 500 RPM. A solution of 0.48 mg of dimethyl zirconium bis(2-methyl-4-phenylindenyl) and 0.96 mg of dimethyl anilinium tetrakis(heptafluoro-2-naphthyl) borate were mixed and placed in a short section of ¼ inch stainless steel tubing with three way valves and unions on both ends to make a catalyst tube. This catalyst tube was screwed on to the port of the reactor and 200 mL of hexane were used to push the catalyst solution into the reactor. Next, 200 mL, of liquid propylene, were added to the reactor using a sight glass. Reactor temperature was slowly increased to 90° C. using a steam jacket. The polymerization was run for 10 minutes at a pressure of 156 psig (1177 kPa). A 7° C. exotherm was experienced but controlled by an Omega PID controller. The reactor temperature was then reduced to 70° C. It took about 15 minutes to stabilize the temperature. Pressure was reduced to 79.8 psig (651 kPa). Ethylene was added to the reactor until its pressure reached 419.2 psig (2991 kPa). The second polymerization ran for 20 minutes. The reactor was cooled to 40° C. and the bottom was dropped. The toluene/polymer was poured into a beaker containing about 500 mL of methanol to quench the reaction. The mixture was filtered and the solids were dried overnight in a vacuum oven at 60° C. Yield was 83.16 g.

Proton NMR composition was analyzed for Example 2 by fitting Markovian statistics for an isotactic polypropylene plus Markovian statistics for an ethylene/propylene copolymer to the areas measured for the six peaks in the aliphatic region of the spectrum. The composition was 8.7 mol % isotactic polypropylene and 91.3 mol % ethylene/propylene copolymer containing 17.7 mol % propylene and 82.3 mol % ethylene. For the ethylene/propylene copolymer the probability along the chain of going from an ethylene to a propylene was 0.172 and the probability of going from a propylene to an ethylene was 0.798. These transition probabilities can be used to calculate the probabilities of triads as well. In particular, the probability of the ethylene-ethylene-ethylene triad or sequences is 0.564, suggesting that this ethylene/propylene copolymer has a lot of long polyethylene runs in it. This is confirmed by the large peak observed in the differential scanning calorimetry data at 68.84° C. Proton NMR chain end analysis showed 0.07 vinylenes, 0.11 trisubstituted olefins, 0.12 vinyls, and 0.00 vinylidenes per 1000 carbons.

Differential scanning calorimetry showed three melting points on the second melt. The peak at 68.84° C. had a heat of fusion of 58.19 J/g, the peak at 127.39° C. had a heat of fusion of 0.92 J/g, and the peak at 156.03° C. had a heat of fusion of 5.75 J/g. The first peak is attributed to polyethylene crystallinity due long methylene runs in the ethylene/propylene copolymer and the third peak is attributed to isotactic polypropylene crystallinity. The very small second peak occurs where pure polyethylene is normally seen in DSC scans.

Size exclusion chromatography using differential refractive index, light scattering, and viscosity detectors was also carried out on this Example. The Mn, Mw, and Mz from the light scattering detector were 88K, 183K, and 386K, respectively. The plot of intrinsic viscosity versus molecular weight was slightly curved with downward curvature at high molecular weights. A small high molecular weight peak was observed in the light scattering and viscosity detector chromatograms, suggesting the presence of a small amount of high molecular weight cross product between the iPP and EP polymers.

Analytical temperature elution fractionation, TREF, was carried out and showed three peaks. 83.0% of the area was observed in a peak at 47.4° C., which is attributed to high ethylene crystallinity ethylene/propylene copolymer and 11.1 area % was observed at 108.9° C., which is attributed to isotactic polypropylene. The soluble fraction was 6.0 area %, and is probably due to ethylene/propylene copolymer which was essentially amorphous.

Figure 6:
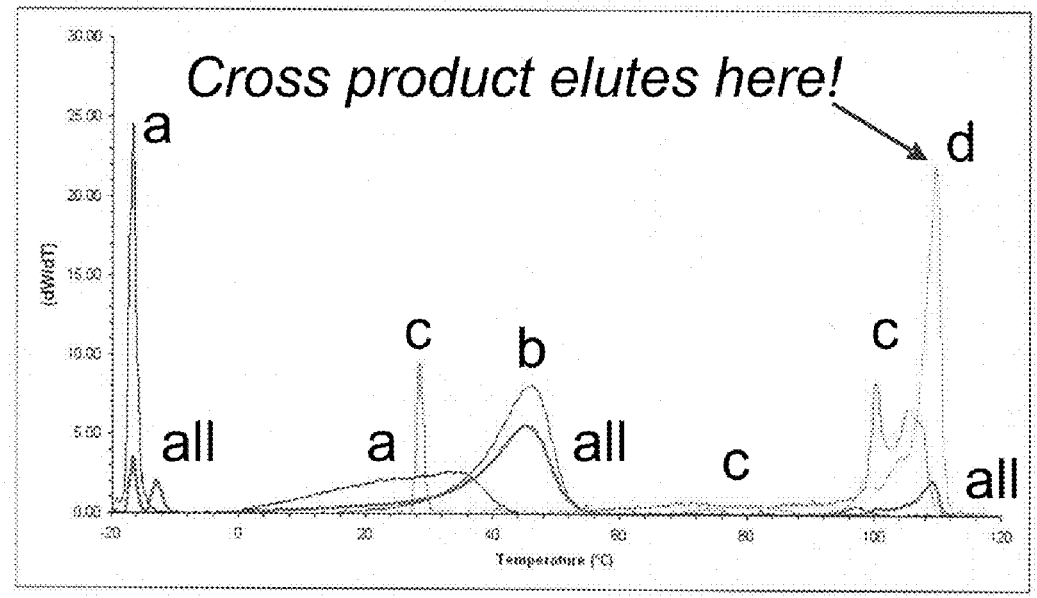
FIG. 6 shows the temperature rising elution fractionation (TREF) trace of dw/dt against elution temperature for the in-reactor polymer blend of Example 2.
Figure 7:
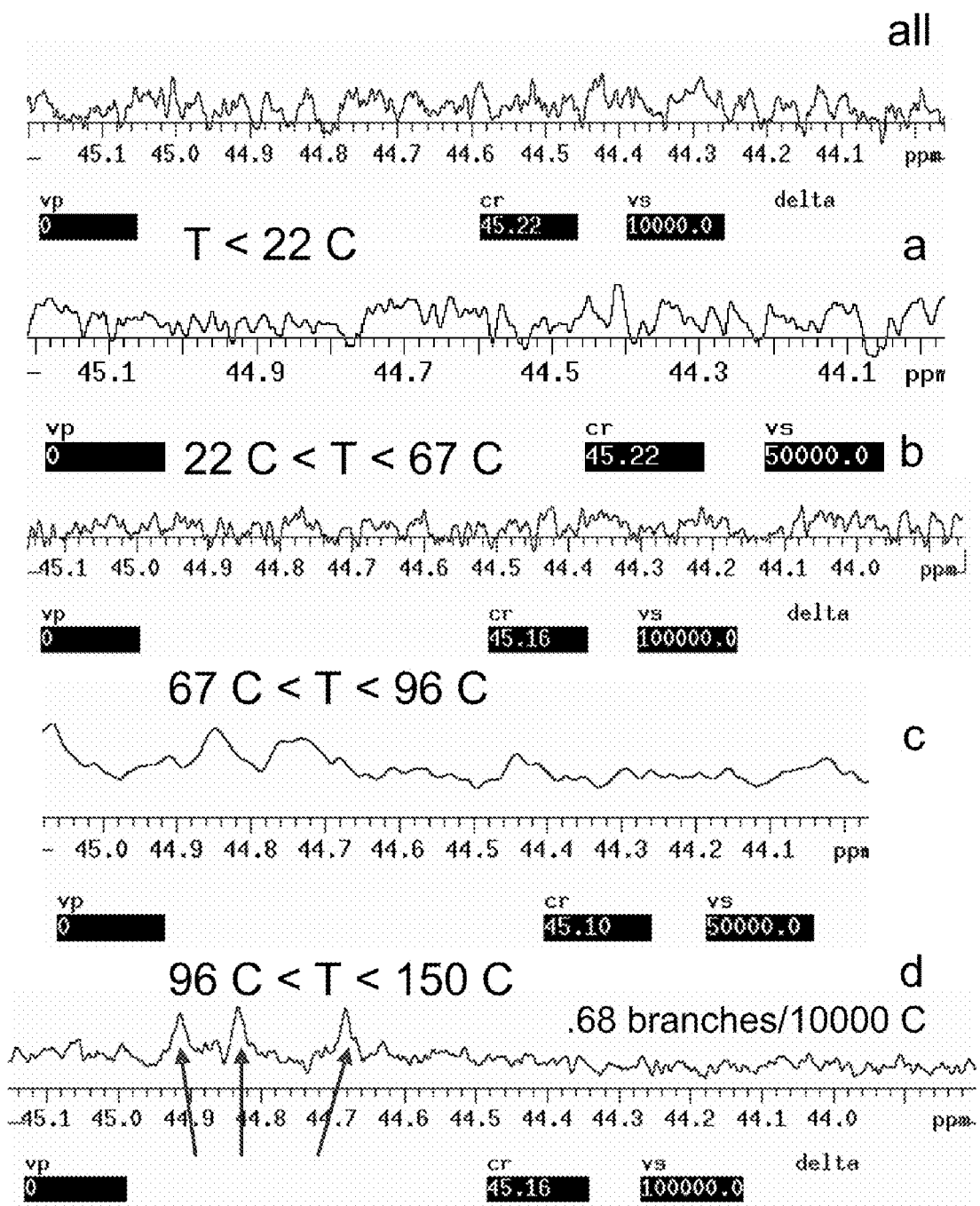
FIG. 7 shows the $^{13}C$ NMR spectra of the fractions obtained after temperature rising elution fractionation of the in-reactor polymer blend of Example 2.

Preparative temperature elution fractionation was carried out and four fractions were collected: 1956.4 mg of material at temperatures less than 15° C., 6357.8 mg between the temperatures of 15 and 55° C., 308.6 mg between the temperatures of 55 and 100° C., and 855.1 mg between 100 and 150° C. The large fraction between 15 and 55° C. is attributed to high ethylene content ethylene/propylene copolymer, while the large fraction between 100 and 150° C. is attributed to isotactic polypropylene. The analytical TREF spectra for these four fractions and for the whole sample of Example 2 polymer are plotted in FIG. 6 and are labeled a-d.

$^{13}$C-NMR spectra were collected for fractions a-d and were analyzed for the presence of long chain branches. The three methylene carbons next to the branch point are known to absorb between 44 and 45 ppm. They are clearly present only in fraction d, collected between 100 and 150° C. (There may be peaks in fraction c, but they couldn't be integrated.) The cross products between the isotactic polypropylene and ethylene/propylene copolymers are confirmed and elute in the TREF experiment along with the isotactic polypropylene. Integrating the area under these three small peaks, dividing by three, dividing by the total aliphatic area of the $^{13}$C-NMR spectra, and multiplying by 10000, we can calculate the branches per 10000 carbons in fraction d as 0.68. Using the mass fractions measured in the TREF fractionation, the total number of confirmed branch points in this Example is 0.061 per 10000 carbons.

Stress-strain curves were collected from Example 2 and are presented in FIG. 3. Five replicas are averaged for the results. The average modulus (initial slope at zero strain) was 25.74 MPa, The yield stress was calculated by fitting a straight line to the stress-strain curves in the range of strains between 0.5 and 1.0 and extrapolating back to zero strain (the intercept of the straight lines). The yield stress was 3.38 MPa for Example 2. The average strain at break was 9.64 and the average stress at break was 15.32 MPa. Strain hardening index is the increase in the stress-strain curves after yielding. It is defined as the stress at break divided by the yield stress. For Example 2, the strain hardening index was 4.53. It is believed that strain hardening is observed because parts of the chains in the reactor blend are immobilized in crystallites or by branch points. The in-reactor blend of Example 2 behaves as a crosslinked elastomer or a thermoplastic elastomer. As seen in FIG. 3, the values of Example 2 are similar to the commercial thermoplastic elastomer Kraton G1650, an hydrogenated styrene-butadiene-styrene terpolymer.

Small angle oscillatory shear data was collected for Example 2 at 190° C. A plot of loss angle versus frequency is presented in FIG. 4. In this plot the loss angle is the inverse tangent of the storage modulus divided by the loss modulus. For linear polymer chains the polymer melt is fully relaxed at small frequencies or long relaxation times; the storage modulus is much larger than the loss modulus and the loss angles are 90 degrees. For the in-reactor blend of Example 2 the loss modulus is still larger than the storage modulus even at 0.01 sec$^{-1}$. The chains are unable to relax, because of the presence of significant amounts of branching between the isotactic polypropylene chains and the ethylene-propylene copolymers. These effects are believed to be due to branching, because the experiment was carried out at 190° C., above the melting points of both polymers in the blend.

The loss angles are fairly independent of frequency, suggesting the presence of gels in the melt. The curve for Example 2 is flat at a value of 42.6 degrees at the lowest frequency measured, making the critical relaxation modulus equal to 0.47. This low critical relaxation modulus is also indicative of cross products or long chain branches in Example 2.

The dynamic shear viscosity of Example 2 is presented in FIG. 5. This polymer is highly shear thinning. The dynamic viscosity at low shear rates is highly sensitive to those chains in the melt which relax slowly. To quantify how many chains with long relaxation times are present in the melt, the dynamic moduli, G' and G", are fit with a Maxwell model. Using the amount of the chains with 100 second relaxation times divided by the zero shear viscosity, a viscosity fraction of 0.84 is calculated for the chains with 100 second relaxations for the in-reactor blend of Example 2.

Another simple measure of the viscosity shear-thinning in FIG. 5 is the slope of the log(dynamic viscosity) versus log (frequency) plot from a frequency of 0.01 $s^{-1}$ to a frequency of 100 $s^{-1}$. For Example 2 the shear-thinning slope is $-0.55$. The more negative this slope, the more shear-thinning is present in the melt, and the larger the concentration of slow relaxing chains.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

The invention claimed is:

1. An in-reactor polymer blend comprising (a) a propylene-containing first polymer; and (b) an ethylene-containing second polymer such that the polymer blend comprises between about 50 wt % and about 80 wt % units derived from ethylene and between about 50 wt % and about 20 wt % units derived from propylene and is substantially free of dienes, with the content of ethylene in the second polymer found in the form of ethylene-ethylene-ethylene triads being at least 40% and with the in-reactor blend containing at least 0.1 branches having 8 or more carbon atoms per 10,000 carbons of the in-reactor blend, wherein the blend has the following properties:
  (a) at least two peaks when subjected to Differential Scanning Calorimetry corresponding to a first melting point of at least 150° C. and a second melting point of at least 40° C. such that the difference between the first and second melting temperatures is at least 20° C.;
  (b) a strain hardening index of at least 1.8; and
  (c) a shear thinning slope for the log(dynamic viscosity) versus log(frequency) curve of less than $-0.2$.

2. The blend of claim 1 and having a weight averaged molecular weight of at least 150,000 g/mol.

3. The blend of claim 1 and having a heat of fusion, ΔHf, of 80 J/g or less.

4. The blend of claim 3 and having a heat of fusion, ΔHf, of about 20 to about 80 J/g.

5. The blend of claim 1 and having a heat of fusion, ΔHf, of 70 J/g or less.

6. The blend of claim 5 and having a heat of fusion, ΔHf, of about 30 to about 70 J/g.

7. The blend of claim 1, wherein at least 90 wt % of the blend is soluble in refluxing xylene.

8. The blend of claim 1, wherein at least 95 wt % of the blend is soluble in refluxing xylene.

9. The blend of claim 1, wherein 100 wt % of the blend is soluble in refluxing xylene.

10. The blend of claim 1 and having a viscosity fraction of chains with a relaxation time of 100 seconds of at least 0.7.

11. The blend of claim 1 and having a stress at break of at least 14 MPa.

12. The blend of claim 1 and having a strain at break of at least 4.

13. The blend of claim 1 wherein, when fractionated by temperature rising elution fractionation (TREF), the blend produces a) no fraction, or a first fraction having a DSC heat of fusion, ΔHf, of 5 J/g or less, eluting below 10° C., b) a second fraction having a DSC heat of fusion, ΔHf, of 5 to 80 J/g, eluting between 10° C. and 90° C. and c) a third fraction having a DSC melting temperature greater than 140° C. eluting above 90° C.

14. The blend of claim 13 wherein the ratio of the volume of said second fraction to the volume of said third fraction is at least 1.5:1.

15. A process for producing the polymer blend of claim 1, the process comprising:
  (i) contacting at least one first monomer composition comprising propylene with a first catalyst capable of producing polymer having a crystallinity of 20% or more at the selected polymerization conditions in a first polymerization stage under conditions including a first temperature sufficient to produce the propylene-containing first polymer comprising at least 40% vinyl chain ends; and
  (ii) contacting at least part of said first polymer with a second monomer composition comprising ethylene and propylene and with a second catalyst capable of producing polymer having a crystallinity of 5% or more in a second polymerization stage under conditions including a second temperature sufficient to polymerize said second monomer composition to produce the ethylene-containing second polymer, wherein the second temperature is less than the first temperature by at least 10° C.

16. The process of claim 15, wherein said first temperature is between about 80° C. and about 140° C.

17. The process of claim 15, wherein the contacting (i) is conducted by slurry polymerization.

18. The process of claim 15, wherein the contacting (ii) is conducted by solution polymerization.

19. The process of claim 15, wherein the molar ratio of propylene to ethylene in the contacting (ii) is 1:1 or less.

20. The process of claim 15, wherein each of the contacting (i) and contacting (ii) is conducted in the presence of a single site catalyst comprising at least one metallocene catalyst and at least one activator.

* * * * *